United States Patent
Carapelli et al.

(10) Patent No.: US 12,056,559 B2
(45) Date of Patent: Aug. 6, 2024

(54) FUEL DISPENSER FRAUD DETECTION APPARATUS AND METHOD

(71) Applicant: Gilbarco Inc., Greensboro, NC (US)

(72) Inventors: Giovanni Carapelli, Greensboro, NC (US); Wayne McNinch, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 17/477,132

(22) Filed: Sep. 16, 2021

(65) Prior Publication Data

US 2022/0083747 A1 Mar. 17, 2022

Related U.S. Application Data

(60) Provisional application No. 63/078,935, filed on Sep. 16, 2020.

(51) Int. Cl.
*G06K 7/08* (2006.01)
*G06K 7/00* (2006.01)
(Continued)

(52) U.S. Cl.
CPC ........... *G06K 7/084* (2013.01); *G06K 7/0026* (2013.01); *G06K 7/0069* (2013.01);
(Continued)

(58) Field of Classification Search
CPC .... G06K 7/084; G06K 7/0026; G06K 7/0069; G06K 7/10336; G06Q 20/4016; H04B 5/0031
See application file for complete search history.

(56) References Cited

U.S. PATENT DOCUMENTS

| | | |
|---|---|---|
| 4,932,356 A | 6/1990 | Watanabe |
| 4,977,528 A | 12/1990 | Norris |

(Continued)

FOREIGN PATENT DOCUMENTS

| | | |
|---|---|---|
| EP | 2393070 A1 | 12/2011 |
| GB | 2422705 A | 8/2006 |

(Continued)

OTHER PUBLICATIONS

International Search Report and Written Opinion for corresponding International application No. PCT/US2021/050692 dated Mar. 30, 2023; 20 pages.

(Continued)

*Primary Examiner* — Sonji N Johnson
(74) *Attorney, Agent, or Firm* — Nelson Mullins Riley & Scarborough LLP

(57) ABSTRACT

A shimmer detection apparatus for detecting a shimmer within a chip card reader is provided. The shimmer detection apparatus comprises processing circuitry, memory, and a first sensor in electronic communication with the processing circuitry. The first sensor comprises at least one sensor coil. The at least one sensor coil of the first sensor is disposed proximate to contacts of the chip card reader and is operative to generate a first magnetic field when electrical current flows through the at least one sensor coil. The first sensor is operative to measure at least one electrical value from the first magnetic field. The processing circuitry is operative to receive information representative of at least one electrical value of said first sensor. The memory comprises stored therein information representative of at least one predetermined electrical value. A multiplexer and hand-detection functionality is provided. Tampering-detection methods are also provided.

19 Claims, 17 Drawing Sheets

(51) Int. Cl.
*G06K 7/10* (2006.01)
*G06Q 20/40* (2012.01)
*H04B 5/00* (2006.01)

(52) U.S. Cl.
CPC ..... *G06K 7/10336* (2013.01); *G06Q 20/4016* (2013.01); *H04B 5/0031* (2013.01)

(56) References Cited

U.S. PATENT DOCUMENTS

| | | | |
|---|---|---|---|
| 5,319,545 | A | 6/1994 | McGarvey et al. |
| 5,400,253 | A | 3/1995 | O'Connor |
| 5,423,457 | A | 6/1995 | Nicholas et al. |
| 5,671,254 | A | 9/1997 | Nagata et al. |
| 5,689,071 | A | 11/1997 | Ruffner et al. |
| 5,734,851 | A | 3/1998 | Leatherman et al. |
| 5,956,259 | A | 9/1999 | Hartsell, Jr. et al. |
| 6,052,629 | A | 4/2000 | Leatherman et al. |
| 6,435,204 | B2 | 8/2002 | While et al. |
| 6,571,151 | B1 | 5/2003 | Leatherman |
| 6,830,182 | B2 | 12/2004 | Izuyama |
| 6,853,093 | B2 | 2/2005 | Cohen et al. |
| 6,935,191 | B2 | 8/2005 | Olivier et al. |
| 7,151,451 | B2 | 12/2006 | Meskens et al. |
| 7,289,877 | B2 | 10/2007 | Wilson |
| 7,703,676 | B2 | 4/2010 | Hart et al. |
| 7,780,083 | B2 | 8/2010 | Schliebe et al. |
| 8,132,721 | B2 | 3/2012 | Carapelli |
| 8,397,991 | B2 | 3/2013 | Mueller |
| 8,433,441 | B2 | 4/2013 | Oldham |
| 8,556,168 | B1 | 10/2013 | Lewis et al. |
| 8,708,235 | B2 | 4/2014 | Ozawa et al. |
| 8,757,010 | B2 | 6/2014 | Williams et al. |
| 11,257,072 | B1* | 2/2022 | Aument ............ G06Q 20/3224 |
| 2008/0041934 | A1 | 2/2008 | Jenkins |
| 2011/0006112 | A1 | 1/2011 | Mueller |
| 2011/0303745 | A1 | 12/2011 | Jenkins et al. |
| 2013/0062959 | A1 | 3/2013 | Lee et al. |
| 2013/0140364 | A1 | 6/2013 | McJones et al. |
| 2013/0161388 | A1* | 6/2013 | Mitchell ............ G07F 19/2055 235/436 |
| 2013/0299586 | A1 | 11/2013 | Yesil et al. |
| 2013/0334311 | A1 | 12/2013 | Pant et al. |
| 2014/0158768 | A1 | 6/2014 | Ray |
| 2016/0034899 | A1* | 2/2016 | Myers ................. H04B 5/0031 705/44 |
| 2016/0191197 | A1 | 6/2016 | Ray et al. |
| 2016/0283754 | A1 | 9/2016 | Hoson |
| 2016/0358059 | A1 | 12/2016 | Chatterton et al. |
| 2018/0046948 | A1 | 2/2018 | Ray et al. |
| 2018/0067151 | A1 | 3/2018 | Benton et al. |
| 2019/0005503 | A1 | 1/2019 | Hecker |
| 2020/0112343 | A1 | 4/2020 | Myers |

FOREIGN PATENT DOCUMENTS

| | | |
|---|---|---|
| GB | 2446425 A | 8/2008 |
| WO | 2012/154937 | 11/2012 |
| WO | 2013/1493110 | 10/2013 |
| WO | 2018111601 A1 | 6/2018 |

OTHER PUBLICATIONS

Bhaskar et al. "Please Pay Inside: Evaluating Bluetooth-based Detection of Gas Pump Skimmers". Published by USENIX Association dated Aug. 16, 2019. Retrieved on Jan. 21, 2022 from https://www.usenix.org/system/files/sec19-bhaskar.pdf. pp. 373-288.

International Search Report and Written Opinion for corresponding International application No. PCT/US2021/050692 dated Feb. 17, 2022; 28 pages.

Texas Instruments, LDC1000 Inductance to Digital Converter, Data Sheet, Dec. 2013.

Poole, Nick, "Credit Card Skimmers Evolved: Shimming" dated Apr. 30, 2018, accessed from https://www.sparkfun.com/sparkx/blog/2673 on Dec. 15, 2021, all enclosed pages cited.

"ATM 'Shimmers' Terget Chip-Based Cards" dated Jan. 27, 2017, accessed from https://krebsonsecurity.com/2017/01/atm-shimmers-target-chip-based-cards/ on Dec. 15, 2021, all enclosed pages cited.

International Search Report and Written Opinion for Application No. PCT/US2015/043211, dated Oct. 23, 2015.

* cited by examiner

|  | $S_1$ | $S_2$ | *** | $S_N$ | $S_{ENVIRONMENTAL}$ |
|---|---|---|---|---|---|
| CALIBRATION VALUE (AVERAGE) |  |  | *** |  |  |
| REAL TIME VALUE 1 |  |  | *** |  |  |
| REAL TIME VALUE 2 |  |  | *** |  |  |
| REAL TIME VALUE 3 | *** | *** | *** | *** | *** |
| *** |  |  | *** |  |  |
| REAL TIME VALUE N |  |  | *** |  |  |

FIG. 9

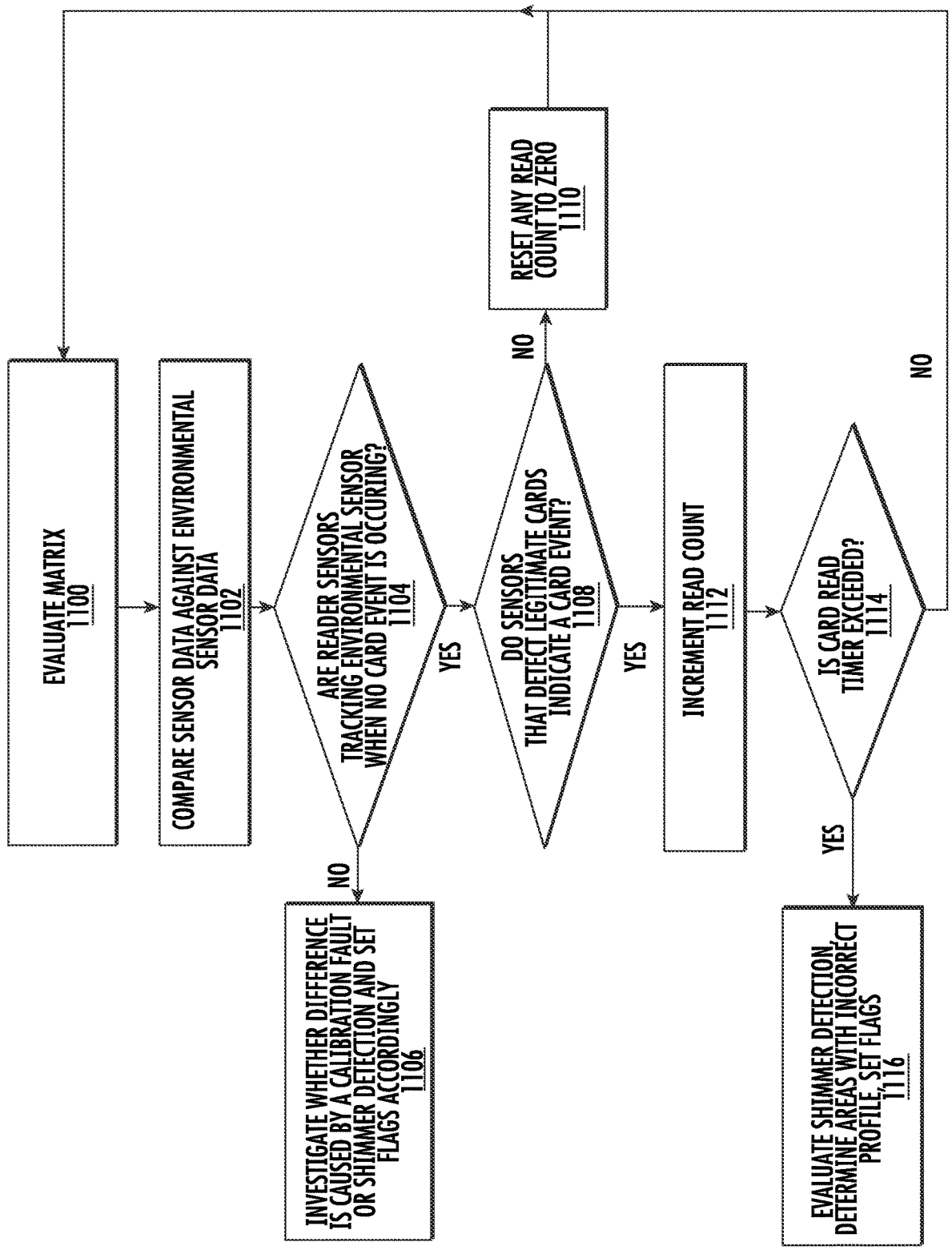

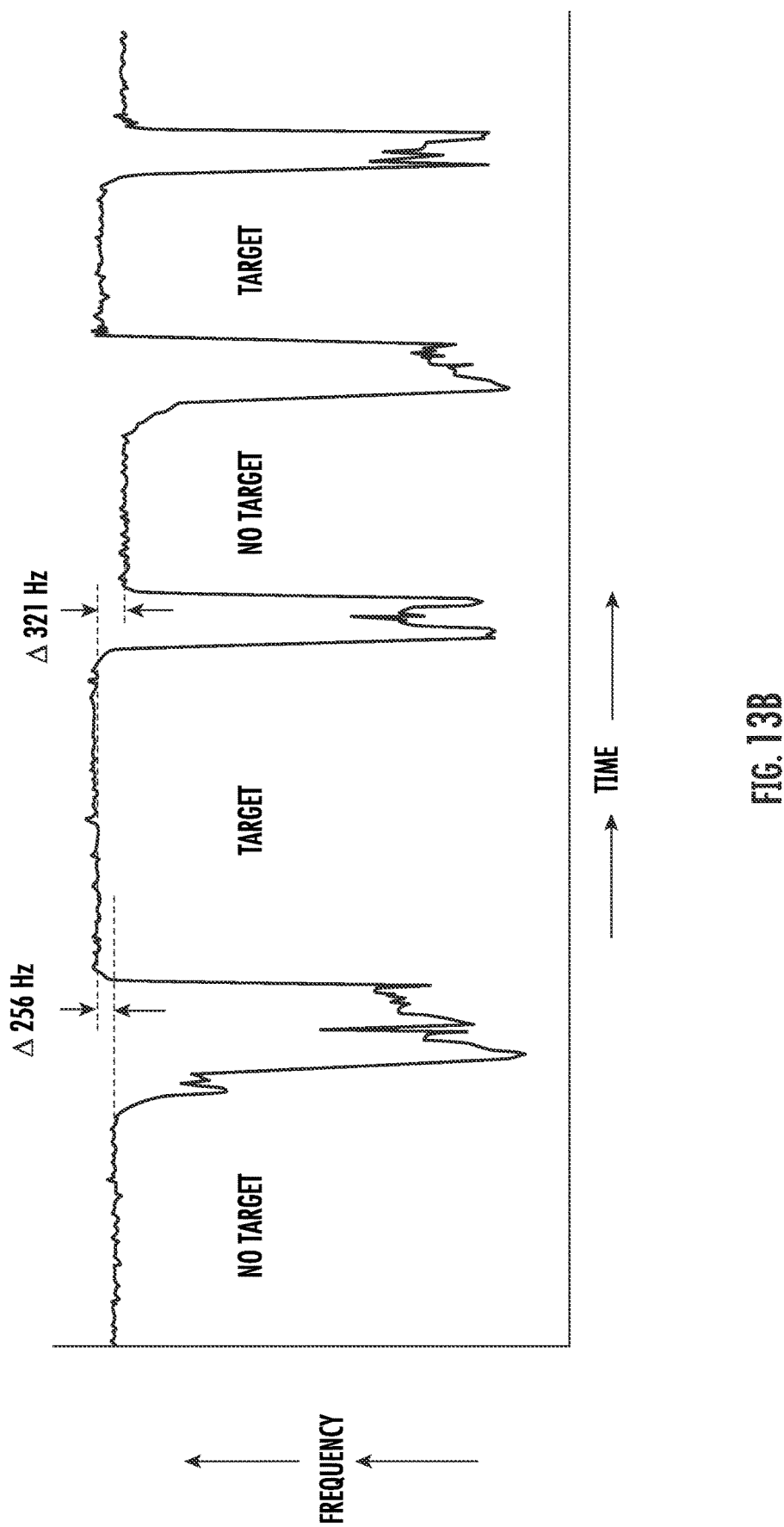

FUEL DISPENSER FRAUD DETECTION APPARATUS AND METHOD

PRIORITY CLAIM

This application is based upon and claims the benefit of provisional application Ser. No. 63/078,935, filed Sep. 16, 2020, which is incorporated by reference herein in its entirety for all purposes.

FIELD OF THE INVENTION

Embodiments of the present invention relate generally to fuel dispenser and other retail payment systems. More particularly, embodiments of the invention relate to systems and methods for detecting and preventing fraud caused by shimmers and other skimming devices associated with various payment system input devices including chip card readers.

BACKGROUND OF THE INVENTION

Payment systems have been incorporated into fueling sites in order to allow a customer to pay for fuel and other goods and services (such as a car wash, fast food, or convenience store products) using a credit or debit card. Such payment systems comprise various input devices, such as card readers and PIN pads, which are configured to accept data necessary to process the payment. One such input device that is prevalent today is a chip card reader by which a customer provides certain payment data by presenting a payment card having a chip. Data stored on the chip card may include one or more of the following: a Primary Account Number (PAN), the cardholder's name, a service code, and the card's expiration date. Additionally, if it is required to complete a transaction, the customer may enter account information such as a personal identification number (PIN) using a PIN entry device (e.g., a PIN pad). The chip card system communicates the data to a remote host system responsible for the customer's account for verification. Chip cards and non-chip payment cards may incorporate a magnetic stripe containing magnetically encoded card account information. The payment system may also incorporate a magnetic stripe reader as an additional input device to read information from the magnetic stripe.

Payment systems may be subject to potential fraud. Users of these payment systems may be faced with a risk that their financial and personal information may be involuntarily divulged. Merchants, banks, and others are also faced with challenges. For example, as the threat of fraudulent devices being used in chip card readers and other payment devices increases, banks and other institutions providing payment cards may face financial losses or a decline in potential customers.

Any unauthorized attempt to acquire data associated with a transaction at an input device may be referred to as "skimming." Data such as credit or debit card numbers, PINs, or other account information can be illegally obtained through skimming. Those of skill in the art are familiar with examples of techniques used to "skim" transaction data, which often involve the placement of an inconspicuous device capable of capturing data in the vicinity of an input device. For instance, fraudsters may overlay a data capture device resembling a card reader or keypad on the actual card reader or keypad so that, when a user completes a transaction, the overlaid device simultaneously captures the user's account information. In some cases, the data capture device also transmits the captured data to the fraudsters. To further avoid detection, skimmers have also placed data-capture devices within an input device or behind a bezel or fascia in which an input device is mounted. In other cases, fraudsters have installed small, unobtrusive cameras in the vicinity of PIN pads to capture PINs. Some fraudsters place a metallic, magnetic read head on a shimmer adjacent to the card reader's magnetic stripe read head so that, as an EMV card with a magnetic stripe is inserted into the card reader, the card will also be received within the shimmer's read head so that information may be fraudulently obtained. Additional information regarding "skimming" fraud is provided in commonly-assigned U.S. Pat. No. 8,132,721, the entire disclosure of which is incorporated by reference herein for all purposes.

Attempts have been made to combat fraud caused by skimming. Known methods include ultrasonic monitoring of an area in front of a card reader or for changes in "acoustic impedance." Other methods include narrowband monitoring for electrical emissions and attempts at electronic "jamming" of a skimming device overlaid on an input device. As those of skill in the art are aware, however, these methods suffer from a variety of drawbacks. With the ultrasonic monitoring method, for example, temperature and humidity compensation can complicate attempts to detect a change in "acoustic impedance" in the area surrounding the mouth of a payment card reader. Further, ultrasonic monitoring of the area in front of the card reader has limited resolution, it cannot monitor the card reader interior, and the potential locations of ultrasonic transceivers are constrained by the layout of the card reader bezel.

More recently, a new type of skimmer has emerged that is called a shimmer. Shimmers are small skimming devices that may be placed within a chip card reader. These shimmers can be very difficult to detect. Because shimmers may be installed within a chip card reader, shimmers are typically not visible once installed unless the chip card reader is disassembled. Shimmers may be positioned so that they rest between contacts of a chip card reader and the position where a chip card is inserted. In this way, the shimmer may come into contact with both the chip card reader and the chip card when a chip card is inserted. Shimmers may attempt to mimic the contact surfaces of the chip card reader's contacts, and shimmers may also attempt to mirror the contact surfaces of chip cards. By doing this, a typical chip card reader may not detect any abnormalities when a shimmer is installed. Additionally, people posing as customers may approach the chip card reader to install the shimmer.

Noise within sensor data may make it difficult to detect shimmers. Such noise may be relatively large due to external influences, natural variation in sensor data, etc. Shimmers often have a thickness that is lower than half the thickness of a typical credit card, making the shimmers very thin. Because of their small size, shimmers typically have small metallic profile modification effects. This—coupled with the relatively high amount of metal within a typically chip card reader and fuel dispenser—makes shimmers difficult to detect using metal detection techniques.

Therefore, room exists in the art for novel shimmer detection devices and methods.

SUMMARY OF THE INVENTION

The present invention recognizes and addresses the foregoing considerations and others of prior art constructions and methods.

According to one aspect of the invention, a shimmer detection apparatus for detecting a shimmer is provided. This shimmer detection apparatus comprises a chip card reader defining a slot for receipt of a chip card. Processing circuitry including a memory is also provided. The shimmer detection apparatus also comprises a first sensor in electronic communication with the processing circuitry. This first sensor comprises at least one sensor coil that is disposed proximate to contacts of the chip card reader. The at least one sensor coil of the first sensor is operative to generate a magnetic field when electrical current flows through the at least one sensor coil, and the first sensor is also operative to measure at least one electrical value from the first magnetic field. The processing circuitry is operative to receive a signal that is representative of at least one electrical value of the first sensor. Additionally, the memory has stored therein a predetermined value of the at least one electrical value.

The shimmer detection apparatus may include a second sensor in electronic communication with the processing circuitry, and this second sensor comprises at least one sensor coil. The second sensor is disposed away from the chip card reader, and the at least one sensor coil of the second sensor is operative to generate a second magnetic field when electrical current flows through the at least one sensor coil of the second coil. The second sensor is also operative to measure at least one electrical value from second first magnetic field. The processing circuitry is operative to receive information representative of the at least one electrical value of the second sensor. The processing circuitry is further operative is operative to compare the information representative of at least one electrical value of the first sensor with the information representative of at least one electrical value of the second sensor. The processing circuitry is operative to indicate potentially fraudulent activity based on the comparison.

Another aspect of the invention relates to apparatus for detecting tampering with a chip card reader. This apparatus comprises processing circuitry and a first sensor in electronic communication with the processing circuitry, the first sensor comprising at least one sensor coil. The at least one sensor coil of the first sensor is operative to generate a first magnetic field when electrical current flows through the at least one sensor coil of the first sensor, and the first sensor is operative to measure at least one electrical value from the first magnetic field. The apparatus further comprises a second sensor in electronic communication with the processing circuitry, the second sensor comprising at least one sensor coil. The at least one sensor coil of the second sensor is operative to generate a second magnetic field when electrical current flows through said at least one sensor coil of the second sensor, and the second sensor is operative to measure at least one electrical value from the second magnetic field. The processing circuitry is operative to receive a first signal representative of at the least one electrical value of the first sensor, and the processing circuitry is operative to receive a second signal representative of the at least one electrical value of the second sensor. The apparatus further comprises a multiplexer, and this multiplexer is operative to activate only one selected sensor from the first sensor and the second sensor at a given time. The selected sensor is the first sensor at a first time and wherein the selected sensor is the second sensor at a second time.

Another aspect of the invention relates to a method for detecting fraudulent activity involving one or more payment devices linked to that fraudulent activity. This method comprises retrieving a first value, and this first value is generated by at least one sensor when a first payment device is used with a chip card reader. The first value is then compared with a second value, and this second value is predetermined. The method places the first payment device on a fraudulent activity list if the difference between the first value and the second value is greater than a first threshold value. The method places the first payment device on a quarantine list if the difference between the first value and the second value is less than or equal to the first threshold value and greater than a second threshold value. The method permits a second payment device to be used with the chip card reader if the difference between the first value and the second value is less than or equal to the first threshold value.

Another aspect of the invention relates to a method for detecting tampering with a chip card reader involving one or more payment devices linked to that fraudulent activity. This method comprises retrieving a first value, and this first value is generated by at least one sensor when a first payment device is used with the chip card reader. The method generates a first probability based on this first value, and this first probability is indicative of the likelihood that a fraudulent device is present within a chip card reader. The method compares this first probability with a second probability, and this second probability is predetermined. The method places the first payment device on a fraudulent activity list if the difference between the first probability and the second probability is greater than a first threshold value. The method places the first payment device on a quarantine list if the difference between the first probability and the second probability is less than or equal to a first threshold value and greater than a second threshold value. The method also permits a second payment device to be used with the chip card reader if the difference between the first probability and the second probability is less than or equal to a first threshold value.

Another aspect of the invention relates to apparatus for detecting tampering with a chip card reader. This apparatus comprises processing circuitry and a sensor in electronic communication with said processing circuitry. The sensor comprises at least one sensor coil, and this at least one sensor coil is disposed proximate to a chip card reader. The at least one sensor coil is operative to generate a magnetic field when electric current flows through the at least one sensor coil. The sensor is operative to measure at least one electrical value from the magnetic field. The processing circuitry is operative to receive a signal representative of at least one electrical value of the sensor, and the sensor is operative to detect the presence of a human hand proximate to the chip card reader.

Another aspect of the invention relates to apparatus for detecting tampering. This apparatus comprises a chip card reader and processing circuitry and a first sensor in electronic communication with the processing circuitry. The first sensor is operative to measure at least one electrical value indicative of a metal profile of the chip card reader. The apparatus further comprises a second sensor in electronic communication with the processing circuitry. The second sensor is operative to measure at least one electrical value indicative of a metal profile of the chip card reader. The processing circuitry is operative to receive a first signal representative of the at least one electrical value of the first sensor, and the processing circuitry is also operative to receive a second signal representative of the at least one electrical value of the second sensor. The device further comprises a multiplexer operative to activate only one selected sensor from the first sensor and the second sensor at a given time, wherein said selected sensor is the first sensor at a first time and wherein said selected sensor is the second sensor at a second time.

Another aspect of the invention relates to apparatus for detecting tampering with a chip card reader. This apparatus comprises processing circuitry and a first printed circuit board assembly. The first printed circuit board assembly comprises a first sensor in electronic communication with the processing circuitry. The first sensor comprises at least one sensor coil, and the at least one sensor coil of the first sensor is operative to generate a first magnetic field when electrical current flows through said at least one sensor coil of the first sensor. The first sensor is operative to measure at least one electrical value from the first magnetic field. The processing circuitry is operative to receive a signal representative of the at least one electrical value of the first sensor. The first printed circuit board assembly is attached to a first external surface of the chip card reader.

Another aspect of the invention relates to a chip card reader for detecting a shimmer. The chip card reader includes a housing defining a slot for insertion of a chip card. The chip card reader comprises processing circuitry including a memory, and a first sensor in electronic communication with the processing circuitry. The first sensor comprises at least one sensor coil, and the at least one sensor coil of the first sensor is operative to generate a magnetic field when electrical current flows through the at least one sensor coil of the first sensor. The at least one sensor coil of the first sensor is disposed proximate to contacts of the chip card reader, and the at least one sensor coil of the first sensor operative to generate a magnetic field when electrical current flows through said at least one sensor coil, and the first sensor is operative to measure at least one electrical value from the magnetic field. The processing circuitry is operative to receive a signal representative of the at least one electrical value of the first sensor. The memory has stored therein a predetermined value of said at least one electrical value.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 9 is an exemplary chart used to hold data in accordance with an embodiment of the present invention.

FIG. 11 is a flow chart illustrating steps of a method of real time processing for shimmer detection in accordance with an embodiment of the present invention.

FIG. 13B is a graph showing variations in frequency when a shimmer is being inserted in accordance with an embodiment of the present invention.

DESCRIPTION OF THE PREFERRED EMBODIMENTS

Figure 1:
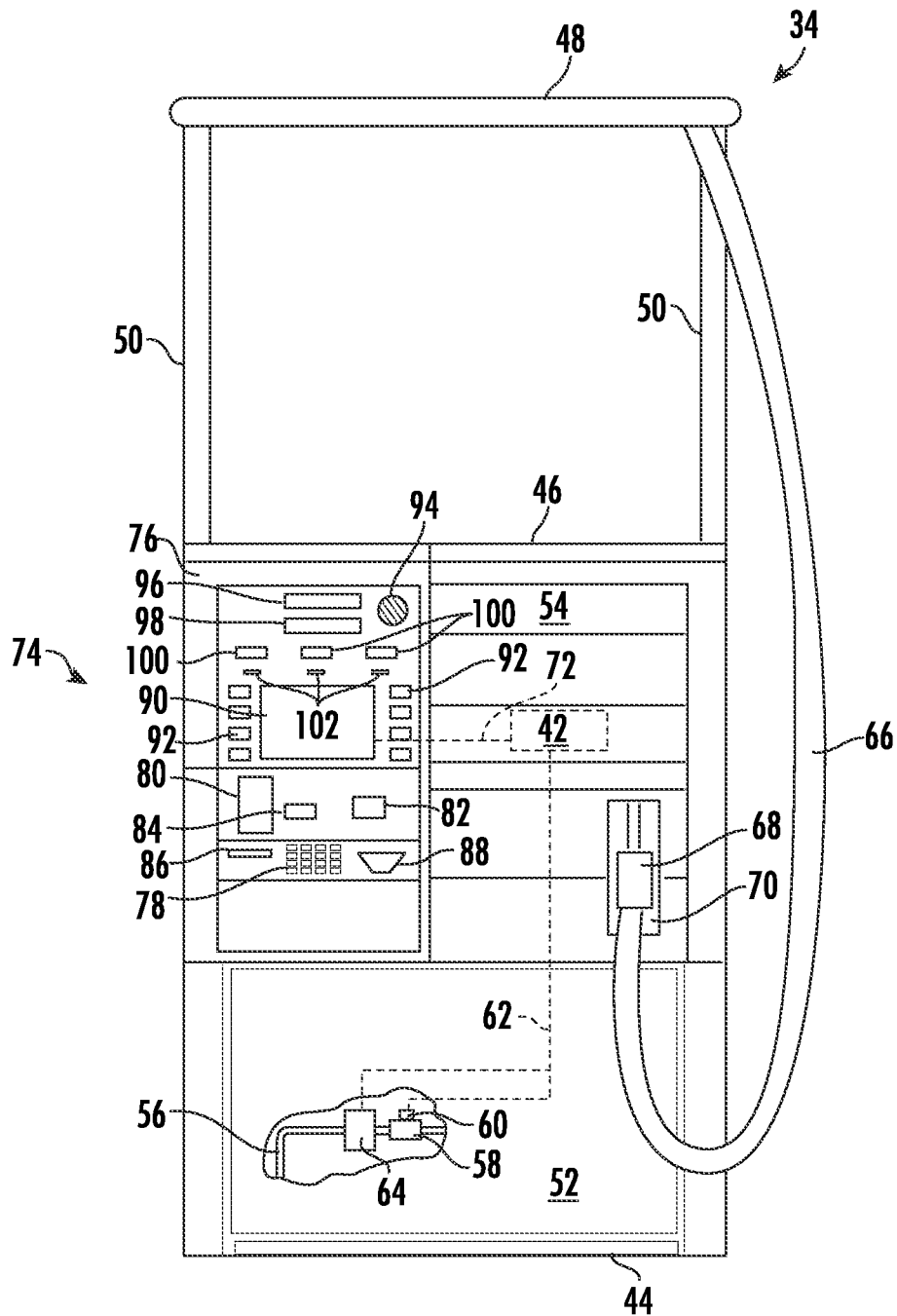
FIG. 1 is a diagrammatic front view of an exemplary fuel dispenser in accordance with an embodiment of the present invention.

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

The fraud detection ("anti-fraud") device described herein may utilize metal detection principles (e.g., inductive techniques) to detect an illegal shimmer disposed within a chip card reader. The fraud detection device may first develop and utilize a metallic and human hand proximity profile of a legitimate chip card reader environment (hereinafter "reference profile"). This reference profile may be created during a calibration process that may be conducted after the initial installation of the chip card reader by legitimate technicians. Various aspects of the chip card reader may be initialized during this calibration process. After calibration, the fraud detection device may monitor the environment and continuously compare the reference profile with the current profile to determine whether a fraudulent device has been added. The addition of shimmers or other fraudulent devices comprised of metal may create detectable differences in the current profile. Based on differences between these two profiles and other input data, the fraud detection device may determine whether an illegal shimmer or some other fraudulent device has been introduced.

The fraud detection device may utilize multiple inductive sensors (e.g. electrical coils) to implement inductive sensing. Certain sensors may be placed proximate to potential locations where a shimmer or some other device may be located, such as above the area where a chip card reader comes into contact with the contact chip of a chip card. Sensors may also be included proximate to a magnetic stripe reader so that sensors in that area can detect additional heads presented by an illegal magnetic read head. Multiple sensors may be used to obtain greater coverage of the areas where a fraudulent device may be located. The fraud detection device may also comprise a multiplexer and may activate only a subset of the sensors at a given time, and, in some embodiments, the multiplexer may activate only one sensor coil at a time. The fraud detection device may cycle through each of the sensors or groups of sensors quickly, activating the sensors or groups of sensors one at a time. In this way, the fraud detection device can quickly scan each of the regions where a fraudulent device may be present.

The fraud detection device also may utilize one or more environmental sensors which are disposed away from the chip card reader. By positioning the environmental sensors away from the chip card reader, the environmental sensors may be located outside of the local electromagnetic fields formed by the other sensors, which allows the environmental sensors to detect macro-influences that are common to all sensors such as temperature, larger electromagnetic interference from other devices, etc. Alternately, the overall profile of all sensors can be averaged to detect environmental changes, where differential changes due to the components of an illegal shimmer in certain areas can still be detected.

The software within the fraud detection device may also allow for certain cards and/or card data to be quarantined where the probability of a fraudulent device being present within a chip card reader is not high enough to establish that a fraudulent device is present but is still much higher than typical probabilities. Cards and/or card data may be placed on the quarantine list, and additional cards may be used with the chip card reader to get additional data as to whether a fraudulent device is present. A microprocessor or some other suitable component within the fraud detection device may establish a communication network for alerting legitimate owners of the reader and associated equipment to the possibility of the presence of a shimmer in the reader or unauthorized personnel in the area. Once a card/card data is placed on the quarantine list, the fraud detection device may communicate with the owner of the chip card reader that a fraudulent device is potentially present so that the chip card reader can be investigated, the bank associated with the card may be notified, and the card owner may be notified.

Specific methods of calibrating the fraud detection device are also provided. Several aspects of the calibration methods allow for improved performance, including but not limited to obtaining appropriate reference profiles, refining the sampling frequency, and modifying the number of data points used to calculate moving averages. By performing such methods, improvements can be made in the fraud detection device's accuracy in detecting fraudulent devices. As discussed previously, the signal-to-noise ratio from sensor readings can be an issue in detecting small skimmers and shimmers. The calibration methods and other features of the fraud detection device described herein permit the device to detect small skimmers and shimmers with a high accuracy rate.

Software executed on the fraud detection device distinguishes between the normal environment of the reference profile and an environment where a shimmer is within the reader so that the fraud detection device may detect the presence of a shimmer. Transient events such as hands in the area or even contact movement within the reader as a card is inserted can also be detected, and high accuracy may be achieved. The accuracy may depend on the fraud detection device's environment and the design of the chip card reader.

The fraud detection device may also detect the presence of human hands within the vicinity of the chip card reader and use that data to assist with shimmer detection. A human hand has an associated capacitance, and the introduction of a human hand near a chip card reader with the fraud detection device installed will cause a modification of the inductive sensing tuned circuit parameters due to this capacitance. This modification of the inductive sensing tuned circuit parameters is also referred to as detuning the resonant frequency. The ability to sense human hands near the reader can be used to distinguish between an ordinary use of the reader, where the card is inserted and then withdrawn relatively quickly, and atypical uses of the reader where hands remain in the area for in inordinate amount of time. The latter case could be legitimate, such as, for example, when a technician is servicing the reader or nearby equipment. It could also be illegitimate, such as, for example, when a criminal is inserting a shimmer or otherwise tampering with the reader or nearby equipment. Coupled with logging legitimate service technician activity, the system logic may flag potential illegitimate activity based on human hand detection.

The fraud detection device may also be connected to a contact sensor located within a chip card reader or to some other sensor in order to detect when a card or some other foreign object is present within the chip card reader. This sensor may be used to determine the stage of a card transaction, and this additional information as well as information provided from other sensors may assist with a determination on whether a fraudulent device is present.

FIG. 1 illustrates a fuel dispenser 34 that may operate in association with a site controller. Dispenser 34 includes a control system 42, which may be any suitable computing electronics with associated memory and software programs running thereon, whether referred to as a processor, microprocessor, controller, microcontroller, or the like (all of which are considered equivalent terms as used herein). In a preferred embodiment, control system 42 is comparable to the microprocessor-based control systems used in CRIND and TRIND type units sold by Gilbarco Inc. Control system 42 further controls various aspects of the fuel dispenser 34 as described in more detail below.

Control system 42 is in operative communication with a suitable site controller. In an exemplary embodiment, the site controller may be the PASSPORT® Point of Sale system, sold by Gilbarco Inc. of Greensboro, N.C., although third party site controllers may be used. The site controller may control the authorization of fueling transactions and other conventional activities as is well understood, and the site controller may preferably be in operative communication with various points of sale. Points of sale may comprise a single computer or server operatively connected to an associated card reader and payment terminal. Additionally, points of sale may include a display, a touch screen, and/or other input devices. Points of sale may be implemented at a variety of locations such as a convenience store, a car wash, a fuel pump, etc. In some embodiments, the site controller may be incorporated into a POS, if needed or desired.

The memory of control system 42 may be any suitable memory or computer-readable medium as long as it is capable of being accessed by the control system, including random access memory (RAM), read-only memory (ROM), erasable programmable ROM (EPROM), or electrically EPROM (EEPROM), CD-ROM, DVD, or other optical disk storage, solid-state drive (SSD), magnetic disc storage, including floppy or hard drives, any type of suitable non-volatile memories, such as secure digital (SD), flash memory, memory stick, or any other medium that may be used to carry or store computer program code in the form of computer-executable programs, instructions, or data. Control system 42 may also include a portion of memory accessible only to control system 42.

In the illustrated embodiment, dispenser 34 has a base 44 and a top 46, with a canopy 48 supported by two side panels 50. Fuel dispenser 34 is subdivided into multiple compartments. In this regard, a hydraulic area 52 encloses hydraulic components and an electronic area 54 encloses electronic components. A vapor barrier may be used to separate the hydraulic area 52 from the electronic area 54.

Several components used to control fuel flow may be housed within the hydraulic area 52. Fuel from underground storage tanks (USTs) is pumped through a piping network into inlet pipe 56. Fuel being dispensed passes through a meter 58, which is responsive to flow rate or volume. A displacement sensor 60 (e.g., a pulser) is employed to generate a signal in response to fuel flow though the meter 58. Signals indicative of the flow of fuel being dispensed are provided to control system 42 via control/data lines 62. Control/data lines 62 may provide control signaling to a valve 64 that may be opened and closed to permit or not permit dispensing of fuel.

Meter flow measurements from sensor 60 are collected by control system 42. Control system 42 also typically performs calculations such as cost associated with a fuel dispensing transaction. Additionally, control system 42 controls transactional processing at fuel dispenser 34 as will be described in more detail below.

As a dispensing transaction progresses, fuel is then delivered to a hose 66 and through a nozzle 68 into the customer's vehicle. Dispenser 34 includes a nozzle boot 70, which may be used to hold and retain nozzle 68 when not in use. Nozzle boot 70 may include a mechanical or electronic switch to indicate when nozzle 68 has been removed for a fuel dispensing request and when nozzle 68 has been replaced, signifying the end of a fueling transaction. A control line provides a signaling path from the electronic switch to control system 42. Control system 42 may use signaling received via the control line in order to make a determination as to when a transaction has been initiated or completed.

Control/data lines 72 provide electronic communication between control system 42 and a user interface 74. User interface 74 includes various combinations of subsystems to facilitate customer interaction with dispenser 34 and acceptance of payment for dispensed fuel. A bezel 76 acts as a lip around the various subsystems of interface 74. In most cases, bezel 76 is flush with the face of the fuel dispenser; however, in some embodiments it may extend outwardly from the face, in effect forming a raised lip. Bezel 76 may also comprise a plurality of sections that frame or house various subsystems or components.

As shown, user interface 74 includes several input devices with which embodiments of the present invention may be used. For example, user interface 74 may include a keypad 78. Keypad 78 is typically used for entry of a PIN if the customer is using a debit card for payment of fuel or other goods or services. In a preferred embodiment, keypad 78 may be the FlexPay™ encrypting PIN pad offered by Gilbarco Inc. User interface 74 may also include a secure card reader 80 for accepting credit, debit, or other chip or magnetic stripe cards for payment. Additionally, secure card reader 80 may accept loyalty or program-specific cards.

User interface 74 may also include other input devices such as a contactless card reader 82. Further, user interface 74 may include other payment or transactional devices such as a bill acceptor 84, a receipt printer 86, and a change delivery device 88. Receipt printer 86 may provide a customer with a receipt of the transaction carried out at fuel dispenser 34. Change delivery device 88 may deliver change to a customer for overpayment. Other input devices, such as an optical reader and a biometric reader, are also contemplated.

A display 90 may be used to display information, such as transaction-related prompts and advertising, to the customer. In some embodiments, a touch screen may be used for display 90. In this case, display 90 may be configured to display a virtual keypad for receiving payment data such as a PIN of a debit card or the billing zip code of a credit card, for instance. Display 90 may also be used to receive a selection from the customer regarding the displayed information.

The customer may use soft keys 92 to respond to information requests presented to the user via the display 90. An intercom 94 may be provided to generate audible cues for the customer and to allow the customer to interact with an attendant. In addition, dispenser 34 may include a transaction price total display 96 that presents the customer with the price for fuel that is dispensed. A transaction gallon total display 98 may be used to present the customer with the measurement of fuel dispensed in units of gallons or liters. Octane selection buttons 100 may be provided for the customer to select which grade of fuel is to be dispensed before dispensing is initiated. Finally, price per unit (PPU) displays 102 may be provided to show the price per unit of fuel dispensed in either gallons or liters, depending on the programming of dispenser 34.

Further information on and examples of fuel dispensers and retail fueling environments are provided in U.S. Pat. No. 6,435,204 (entitled "Fuel Dispensing System"); U.S. Pat. No. 5,956,259 (entitled "Intelligent Fueling"); U.S. Pat. No. 5,734,851 (entitled "Multimedia Video/Graphics in Fuel Dispensers"); U.S. Pat. No. 6,052,629 (entitled "Internet Capable Browser Dispenser Architecture"); U.S. Pat. No. 5,689,071 (entitled "Wide Range, High Accuracy Flow Meter"); U.S. Pat. No. 6,935,191 (entitled "Fuel Dispenser Fuel Flow Meter Device, System and Method"); and U.S. Pat. No. 7,289,877 (entitled "Fuel Dispensing System for Cash Customers"), all of which are incorporated herein by reference in their entireties for all purposes.

Figure 2:
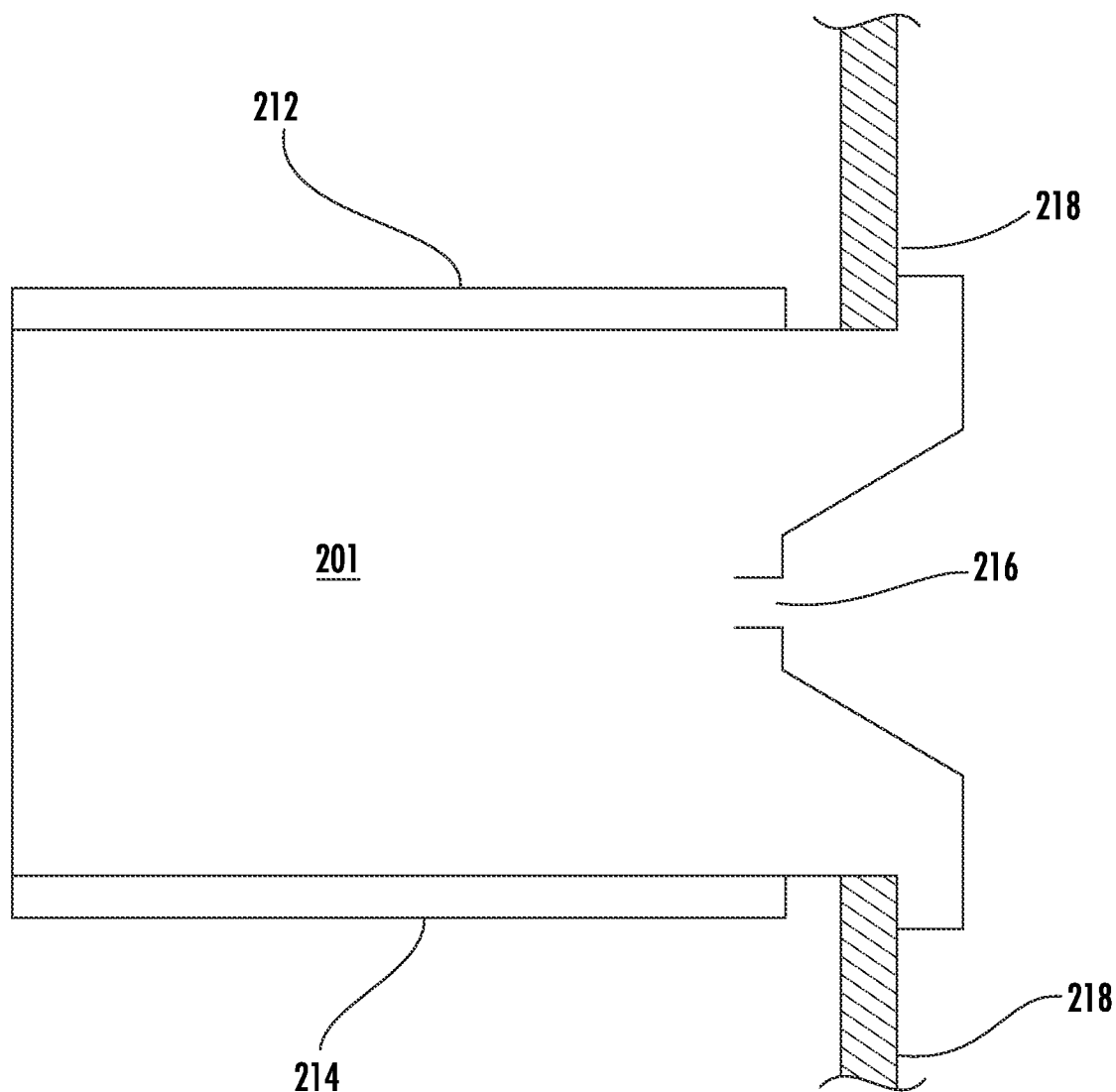
FIG. 2 is a diagrammatic cross-sectional view of a chip card reader disposed within a fuel dispenser in accordance with an embodiment of the present invention.

FIG. 2 is a diagrammatic cross-sectional view of a chip card reader disposed within a fuel dispenser in accordance with an embodiment of the present invention. Chip card reader 201 may be secured within a fuel dispenser system similar to the one presented in FIG. 1. A rear portion of the chip card reader 201 may be secured behind bezels 218 to help prevent the general public from accessing the rear portion of the chip card reader 201. Printed circuit board assemblies (PCBA) 212, 214 may also be installed onto an external surface of card reader 201. As will be further described below, PCBAs 212, 214 may comprise sensors with inductive sense coils for monitoring the area where fraudulent devices may reside. In the embodiment illustrated in FIG. 2, a top PCBA 212 and a bottom PCBA 214 are used, but one or more PCBAs may be used in other embodiments. In other embodiments, PCBAs may be implemented in other positions, whether those positions are on the external surface of the chip card reader 201 or internal to the chip card reader 201. For example, PCBAs could be mounted in positions enabling detection of specific shimmer components that are likely to be in certain areas, such as rogue magnetic read heads placed near the card reader magnetic head, or overlays on the front of the reader containing rogue magnetic heads. When suitable computing electronics with associated memory and software programs running thereon devices and PCBAs are incorporated into a chip card reader as part of its design, fraudulent devices such as shimmers may be detected with lower hardware costs and lower software complexity. Additionally, when PCBAs are incorporated into a chip card reader, PCBAs may at times be implemented closer to critical locations where shimmers and other skimming devices may be located, allowing for a greater ability to detect variations in a magnetic field and a greater ability to detect shimmers and other skimming devices.

FIG. 2 shows PCBAs 212, 214 mounted on both sides of the reader perpendicular to insertion of the chip card. Using multiple PCBAs at these different positions enables the evaluation of inductance data from either side of the reader, one side at a time, using separate RLC circuits, as well as both sides of the reader at the same time, using multiple coils in the same RLC circuit. This extra dimension of data can be incorporated into a matrix to better enable determination of differences in the overall magnetic profile, making it easier to detect whether a small fraudulent device such as a shimmer is present or not.

The fraud detection device may be retrofittable in some embodiments so that the device can be introduced into a chip card reader environment without making significant modifications to the chip card reader itself. As shown in FIG. 2, the fraud detection device may be retrofitted to the area surrounding the chip card reader in an area that is not accessible to the general public. The fraud detection device may achieve differing levels of effectiveness in detecting fraudulent devices depending on the design of the chip card reader as this design may impact the placement of the fraud detection device's sensors. However, the fraud detection device may be readily accessible in some embodiments, and, where this is the case, the fraud detection device may be camouflaged and/or anti-tampering technology may be included to detect when the fraud detection device has been tampered with. For example, sensors may be used to detect the presence of the fraud detection device, and a warning may be provided if faults are detected and/or the fraud detection device may prevent the chip card reader from going forward with further transactions until the fraud detection device is properly reinstalled.

Figure 3:
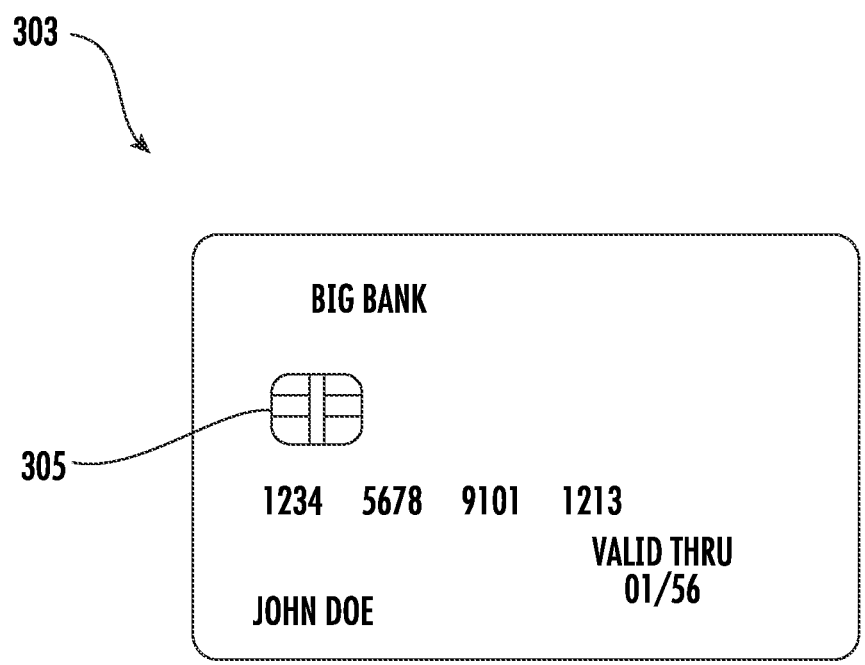
FIG. 3 is a front view of an exemplary chip card that may be used with a chip card reader in accordance with an embodiment of the present invention.

FIG. 3 is a front view of an exemplary chip card that may be used with a chip card reader in accordance with an embodiment of the present invention. Chip card 303 comprises a contact chip 305. Various types of cards may be used such as credit cards, debit cards, etc. A magnetic stripe may be placed on the side of the card opposite the chip contacts.

Figure 4A:
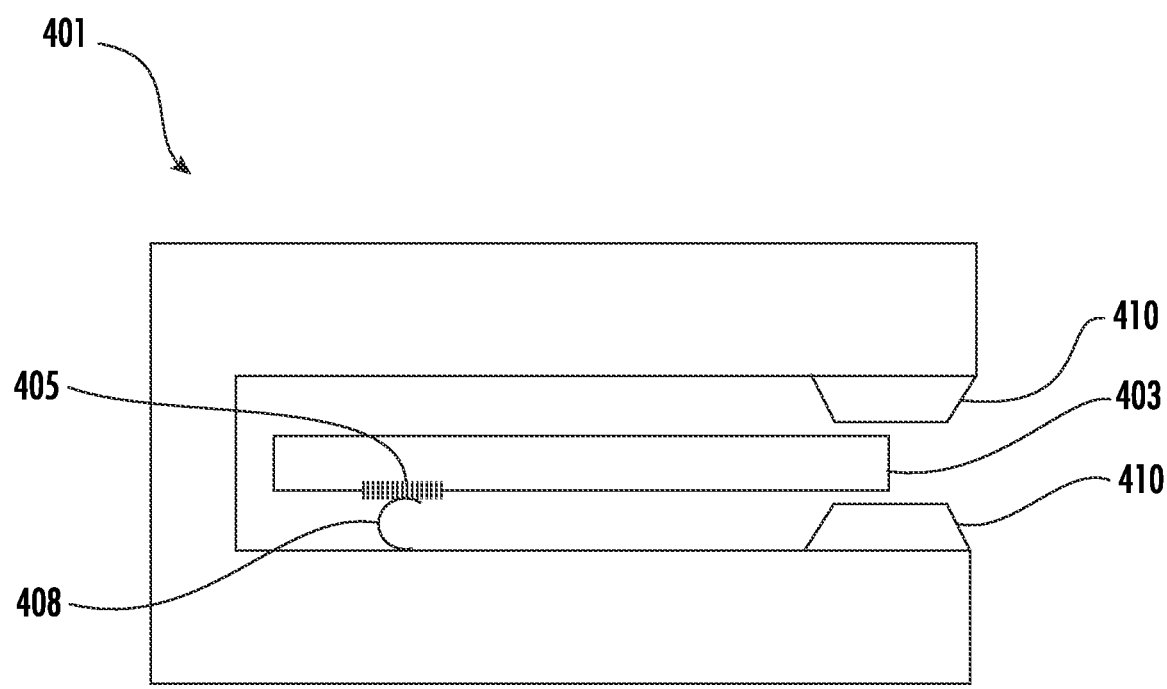
FIG. 4A is a diagrammatic cross-sectional view of a chip card reader in accordance with an embodiment of the present invention with a chip card inserted where no shimmer device has been implemented.

FIG. 4A is a diagrammatic cross-sectional view of a chip card reader with a credit card inserted where no shimmer device has been implemented in accordance with an embodiment of the present invention. Chip card reader 401 is depicted with chip card 403 inserted into the chip card reader 401. The chip card 403 may comprise a contact chip 405. When the chip card 403 is properly inserted, the contact chip 405 comes into contact with contacts 408 of chip card reader 401 to form a contact interface. By achieving this contact between the contact chip 405 and contacts 408, a circuit is formed between the contact chip 405 and contacts 408, allowing information to be communicated from the chip card 403 to chip card reader 401. This information may include the card owner's sensitive financial and personal information. The chip card reader 401 may also have bezels 410 to help guide cards into the correct position and to prevent the general public from accessing the internal portion of chip card reader 401.

Figure 4B:
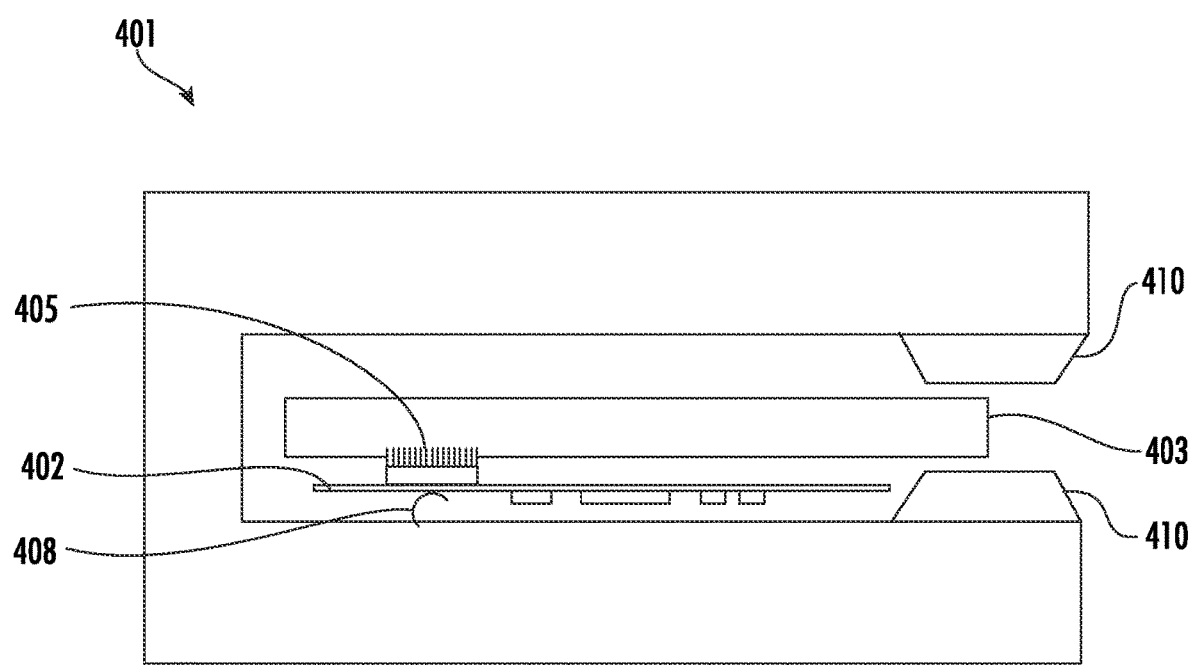
FIG. 4B is a diagrammatic cross-sectional view of a chip card reader in accordance with an embodiment of the present invention where a shimmer device has been illicitly implemented.

FIG. 4B is a diagrammatic cross-sectional view of a chip card reader with a credit card inserted where a shimmer device has been implemented in accordance with an embodiment of the present invention. As shown, shimmer 402 has been inserted within the chip card reader 401 between contacts 408 and contact chip 405. Shimmer 402 may be designed to be inserted into a chip card reader 401 in such a way that it is retained, remaining out of sight, once inserted. The thickness of the chip card 403 can be over two times greater than the thickness of shimmer 402. Thus, shimmer 402 may be thin enough to still permit chip card 403 to be inserted into chip card reader 401 even though the shimmer 402 is also in place within the chip card reader 401. Shimmer 402 may be located such that it can intercept communications between contact chip 405 and contacts 408. When a chip card 403 has been inserted, shimmer 402 contains contacts that will mate with contacts 408 on one side and the chip card contact chip 405 on the other. In this way, the shimmer 402 can intercept communications existing at the contact interface between the contact chip 405 of the chip card 403 and the contacts 408 of chip card reader 401. Shimmer 402 may also be designed to work with specific types of chip card readers.

Shimmer 402 may steal power from the chip card reader 401 as a power interface may be provided on contacts 408. This power interface may enable powering electronics located on the shimmer. Shimmer 402 may itself possess a power interface to supply power to chip card 403. Shimmer 402 may comprise electronic circuitry, including a microprocessor and associated memory. Stolen card data may be retrieved from the shimmer 402 by removing the shimmer and downloading the data of into another device. Shimmer 402 may also comprise electronics for wirelessly transmitting stolen chip card data through technology such as Bluetooth, BLE, Wi-Fi, proprietary radio communication, etc. Where such electronics are present, stolen card data may be transmitted to another device without removing the shimmer 402.

Figure 5:
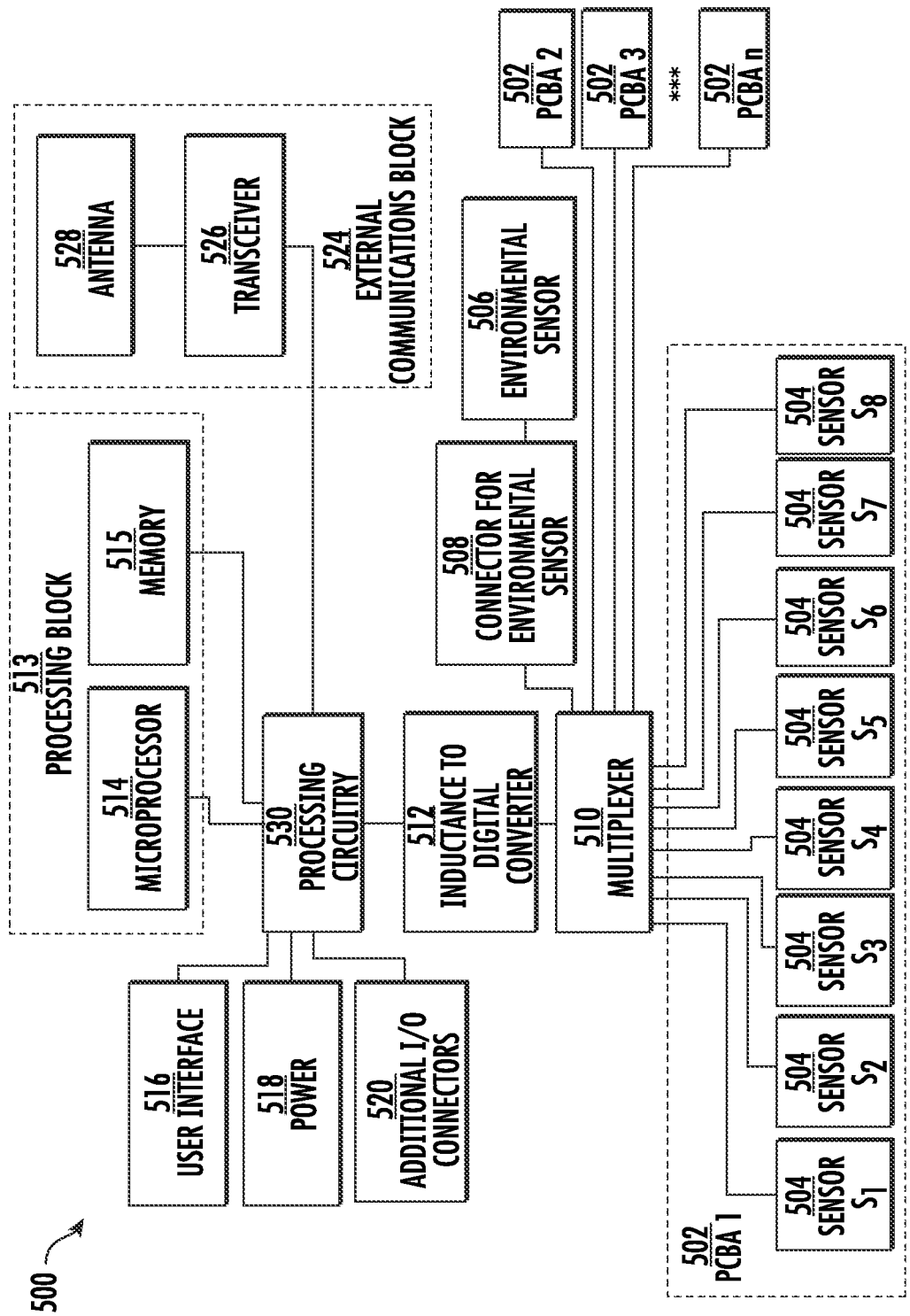
FIG. 5 is a block diagram of hardware components within an exemplary fraud-detection apparatus in accordance with an embodiment of the present invention.

FIG. 5 is a block diagram of hardware components within an exemplary fraud detection apparatus in accordance with an embodiment of the present invention. Fraud detection device 500 may comprise one or more printed circuit board assemblies (PCBAs) 502. Each PCBA 502 may comprise one or more sensors 504, which may take the form of an inductive sensor comprising an inductive sensor coil. As shown in FIG. 5, PCBA 1 possesses eight sensors 504 in this case. Additional PCBAs such as PCBA 2 and PCBA 3 may be included, and these may comprise a different number of sensors than PCBA 1. Sensors can also be integrated onto a PCBA having the processing circuitry and other components with proper segregation of sensors and those components.

The hardware components shown in FIG. 5 may each be integrated into a single physical fraud detection device 500 or the hardware components may be included in separate, connected components forming an overall apparatus. For example, as shown in FIG. 2, PCBAs 212, 214 may be integrated on a top surface and a bottom surface of a chip card reader 201, and one of these two PCBAs could contain the majority of the circuitry shown in the block diagram of FIG. 5 while the other PCBA may only have sensors 504 with associated sensor coils, with sensors 504 interfaced to the active circuitry via connectors on each PCBA. Additionally, each component shown within FIG. 5 may be implemented as an integrated circuit ("IC") or ICs with associated components.

Sensors 504 may scan an area above or below the inductive sensor coil. By using multiple sensors 504 and, where appropriate, multiple PCBAs 502, the areas where shimmers or other fraudulent devices may be located can be covered more effectively. The sensors may be arranged to target specific areas where fraudulent devices may be located. Sensors are more likely to detect a fraudulent device if that fraudulent device has a larger amount of metal or if the sensor is positioned closer to the metal within the fraudulent device, so sensors may be more effective at detecting a fraudulent device if they are located closer to the fraudulent device. However, sensors may also be positioned at other areas of the device to obtain data points from various positions. This may be beneficial where one sensor possesses a large amount of noise in the data signals as a result of its position. One skilled in the art can design the sensors to target specific points within the card reader where shimmers or associated components may reside. This can be done, for example, by adjusting the number of turns of the spiral and the geometry of the spiral. In this way the sensor design can be tuned to match a specific card reader design if desired.

Fraud detection device 500 may also comprise one or more environmental sensor(s) 506. It will be appreciated that the environment in which the fraud detection device 500 is employed is variable. As a result, numerous things can affect its calibration, even after the reference profile is established upon initial installation of the fraud detection device 500. Variables can include the amount of electromagnetic interference in the vicinity of the chip card reader and its installed PCBAs 502. Variations in the environment can also be due to operating electrical circuits in the chip card reader or other nearby electronic modules. Variations may also be due to temperature changes within the environment or even the time of day. For example, oscillators and inductors used in the reader or nearby electronics can interfere with the sensors 504 within the fraud detection device 500. If the reader or surrounding electronics are switched on or off in normal operation, they can be power sequenced during the reference profile calibration to establish the necessary baseline profiles needed for shimmer detection. Environmental sensor 506 may take the form of an inductive sensor, similar to sensors 504. Environmental sensor 506 may be positioned away from the chip card reader and the other sensors 504 to detect variations in the environment. For example, the environmental sensor 506 is preferably located out of the local electromagnetic field formed by the other sensors 504, away from the chip card reader. In this way, environmental sensor 506 monitors "macro influences" in the environment near the chip card reader, but not within its active sensing path. These macro influences are common to all sensors 504 that are part of the fraud detection device 500. In this way, variables such as temperature and larger electromagnetic interference events will be detected by the environmental sensor 506. The microprocessor can then appropriately compensate what it is reading from the sensors 504 that are monitoring the chip card reader by removing (accounting for) common influences.

Only one environmental sensor 506 is shown in the embodiment depicted within FIG. 5. However, additional environmental sensors may be used to obtain data from other positions within the environment. Data from the environmental sensors 506 may be communicated to a microprocessor 514 and/or an associated memory 515 within processing block 513 of fraud detection device 500 using a wired connection. A connector for environmental sensor 508 is shown in FIG. 5 to accomplish this wired connection. However, data from environmental sensors 506 may be communicated through wireless connections as well.

In some embodiments, no environmental sensor 506 is included. Where no environmental sensor 506 is included, the overall profile of all sensors can be averaged to detect environmental changes, where differential changes due to the components of an illegal shimmer in certain areas can still be detected. Even where an environmental sensor 506 is used, the overall profile of all sensors can also be averaged to verify the environmental changes detected by environmental sensor 506.

Fraud detection device 500 may further comprise a multiplexer 510. This multiplexer 510 may receive inputs from each of the sensors 504 and environmental sensors 506. Multiplexer 510 may select only a portion of these inputs to communicate to the processing circuitry at a given time. For example, multiplexer 510 may output data from only one selected sensor at a given time. Multiplexer 510 may allow a single inductance to digital converter to access multiple coils, one at a time, such that the area is scanned over the time period of the scan. The scan time for a single sensor may be very small (e.g., one millisecond). As this scan time decreases, more sensor readings may be obtained at each sensor during a given transaction. Multiplexer 510 may provide electrical current to only one sensor coil at a time in some embodiments, but, in other embodiments, multiplexer 510 may provide electrical current to a pair of sensor coils or a group of sensor coils at one time. In some embodiments, sensor coil pairs may be connected in parallel, and electrical current may be provided to only one pair of sensor coils at a given time. In some embodiments, connecting two or more sensor coils in parallel and activating those sensor coils may result in an improved signal-to-noise ratio.

Multiplexer 510 may scan through each of the sensors 504, 506 to allow sensor data to be obtained from each sensor. Data from each sensor 504, 506 may be output from the multiplexer 510 and converted using one or more inductance to digital converters (LDCs) 512. After the outputted data has been converted, the converted data may be communicated to memory 515 within processing block 513. When converted data is stored in memory 515, the converted data may populate a matrix similar to the one shown in FIG. 9, which will be discussed in greater detail below. This matrix may be retrieved and communicated to microprocessor 514 for further analysis.

LDCs 512 may be application-specific ICs for measuring inductance and/or losses including but not limited to the LDC1000, LDC1612, or LDC1614 inductance-to-digital converters offered by Texas Instruments, Inc. of Dallas, Texas With 16, 24, or 28-bit resolution, the detection process may be capable of detecting and resolving very small changes in inductance and loss parameters. LDCs 512 could be integrated circuits or discrete designs that directly interface to the coils within sensors 504, 506 on the PCBAs 502 and/or external coils. The LDC(s) may excite a coil to produce resonance and detect its resonance frequency in real time. The LDC may also provide the multiplexing function for exciting multiple coils one at a time as described above.

Processing block 513 may comprise microprocessor 514 and memory 515. Processing block 513 may perform the overall anti-fraud system control and communications. Processing block 513 may establish the metallic reference profile, as will be explained in greater detail below. Processing block 513 may perform real time evaluation of the current metallic profile versus the reference profile in order to determine if a shimmer is likely present and in order to perform other detection functions such as human hand proximity detection. Maintenance of real time system calibration and calibration via environmental sensors may also be performed by processing block 513. Additionally, processing block 513 may assist with tampering detection and reporting in some embodiments, and processing block may comprise an anti-tampering microprocessor that is dedicated to preventing tampering or removal of the fraud detection device 500.

Fraud detection device 500 may communicate with other devices using a communications block 524 via wired or wireless communications. In the example provided within FIG. 5, the communications block 524 comprises a transceiver and an antenna 528 for wireless radio communications. For example, wireless communication may be accomplished using Bluetooth, BLE, Wi-Fi, proprietary radio, etc. Encrypted communications can be utilized between elements in the system to avoid communications tampering by the criminals associated with installing shimmers or other illicit activity. Other anti-tampering methods can also be implemented to secure communications, for example the use of anti-tampering microprocessors (not shown) on the PCBAs. The communications block 524 may include a full duplex network interface, which could be via encrypted methods as noted herein. Additionally, physical interfaces could be any of a variety of standard interfaces, such as serial, USB, bus, or wireless interfaces.

Additional or alternative communications interfaces could be utilized with fraud detection device 500. These communications interfaces may include local alerting methods such as form-C contact closures for alerting the possibility of shimmer detection or additional half or full duplex interfaces. For example, the card data quarantine function described in greater detail below could depend on a secondary communications interface to local equipment such as a POS logic board, a fuel dispenser pump controller, ATM controller, etc. Data related to potentially compromised reader transactions could traverse to electronic modules associated with the reader on these other interfaces.

Fraud detection device 500 may also comprise a user interface 516, which may be implemented as part of processing block 513 in some embodiments. User interface 516 may be used to adjust the operation of fraud detection device 500, to permit users to investigate suspicious activity, to enter and monitor a calibration stage of the fraud detection device, etc. Fraud detection device 500 may also comprise power source 518. In some embodiments, fraud detection device 500 may include its own, independent power source, but in other embodiments, fraud detection device may utilize power from the chip card reader with which the fraud detection device is installed. Fraud detection device 500 may comprise one or more input-output ("I/O") connector ports 520, which may be used for receiving and loading data such as encryption keys. Fraud detection device 500 may also comprise processing circuitry 530 including various hardware components as shown in FIG. 5 and connections between these components.

In some embodiments, microprocessor 514 may perform artificial intelligence (AI) training techniques after a reference profile is established in order to adjust for slight variations in the real-time profile over time. For example, the electromagnetic interference in the vicinity of the reader may typically change as a function of time of day, being "quieter" late at night. The reference profile can be modified over time to better compensate for this.

FIG. 5 illustrates an exemplary block diagram of hardware components within a fraud detection device in accordance with a preferred embodiment. Additional hardware could be used within fraud detection device, some hardware may be omitted, and hardware may be connected differently in other embodiments. For example, additional multiplexers could be implemented within each PCBA 502 to output a single signal from each PCBA to multiplexer 510.

Figure 6:
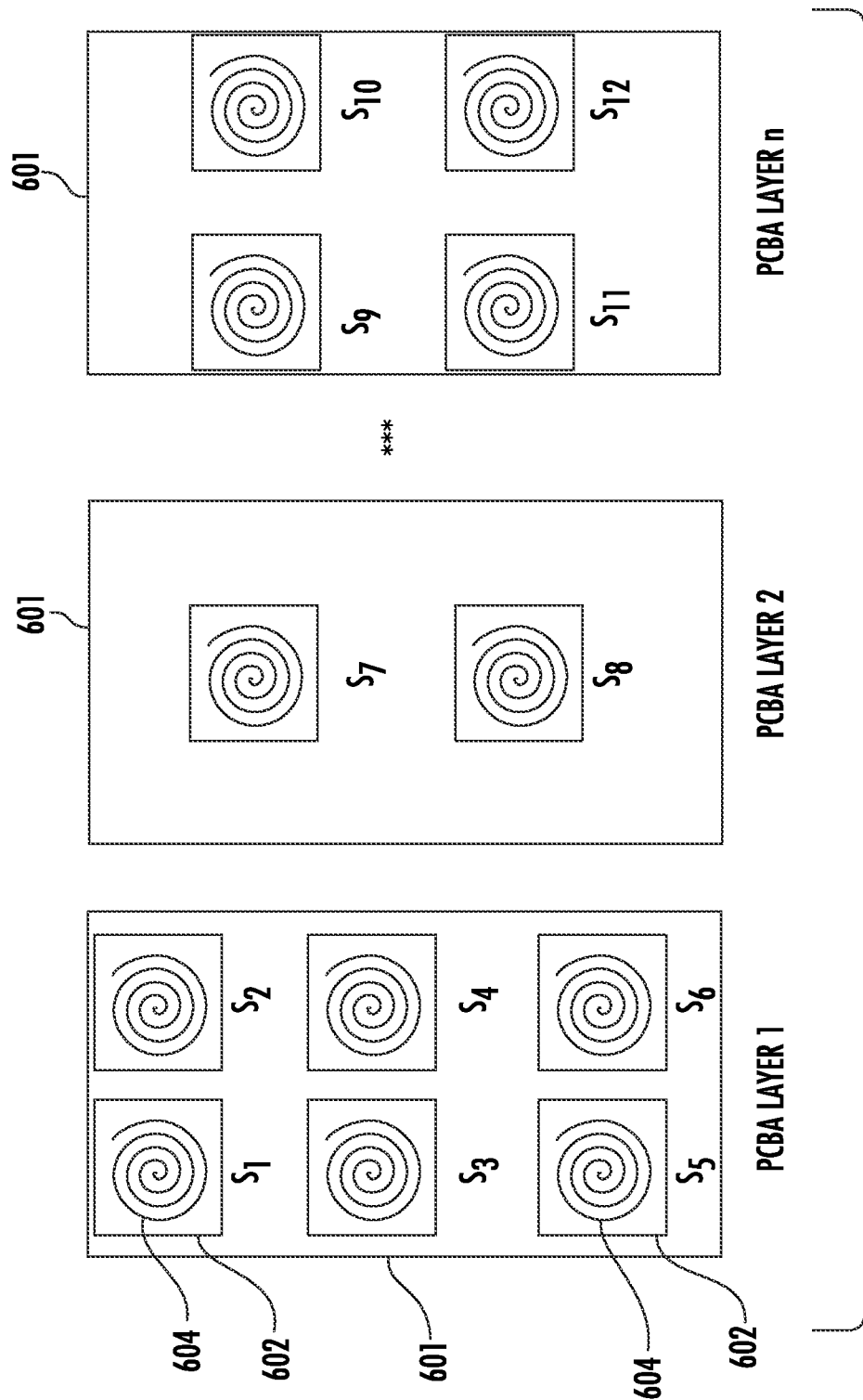
FIG. 6 is a diagrammatic representation of sensor coil arrangements within different layers of a printed circuit board in accordance with an embodiment of the present invention.

FIG. 6 is a diagrammatic representation of sensor coil arrangements within different layers of a printed circuit board in accordance with an embodiment of the present invention. As shown in FIG. 6, sensors 602 may be incorporated into a PCBA layer 601. Sensors 602 comprise a sensor coil 604 that is implemented as a spiral trace on the PCBAs 601. Sensor coils 604 may operate through principles of induction, and they may be part of a resonant RLC (resistive, inductive, and capacitive) circuit. A capacitor of the resonant RLC circuit is typically located near the coil feed point, but the capacitor may be located at other positions. An alternating current ("AC") magnetic field may be formed perpendicular to a resonating (active) sensing coil 604. When metal is introduced near a sensing coil 604, energy is transferred via the AC magnetic field to the introduced metal and eddy currents are created within the introduced metal. The introduction of metal near a sensing coil 604 also causes changes to the frequency of resonance, so the frequency of the RLC circuit may be monitored to detect changes in the AC magnetic field. The real time resonance frequency of the RLC circuit may be converted via an analog-to-digital converter to a digital value, known as the inductive sense value. ICs containing required LDC circuitry are commonly available. Such ICs usually have interfaces for connecting the sensing coils 604 (or multiple coils) and associated RC components, as well as a microprocessor within the IC. Such circuits may also be discretely implemented. The digital inductive sense values may be coupled to a microprocessor (FIG. 5, 514) and/or an associated memory (FIG. 5, 515) where analysis of the resonant frequency data is performed.

PCBA layers 601 may include sensor coils 604 that are offset from those on other adjacent layers, as illustrated in FIG. 6. These adjacent layers 601 may be stacked on top of each other. Prudent use of overlapping sensor coils 604 can allow for better design of the coil geometry for reaching the target (e.g., the shimmer or other skimming device) while enabling better flexibility of the fraud detection device to develop a complete scan of the overall shimmer target area. Though overlapping coils may interfere with any resonating (active) coil, the interference effects can be mitigated through design analysis and an implementation of an appropriate coil pattern. Additionally, an initial determination of the metallic reference profile as described herein can account for any interference caused by overlapping or nearby coils.

Using an arrangement of sensor coils 604 similar to the one shown in FIG. 6, the fraud detection device can better detect shimmers and other fraudulent devices. As shown in FIG. 4B, certain portions within the chip card reader 401, when occupied by a shimmer 402, may have more metal than others. For example, the area on the chip card 403 where contacts 408 are located is specified (known a priori), and the shimmer 402 will include metal contacts in that area for intercepting the chip card-to-reader transfer of data. While the amount of metal within semiconductors is typically low, their bond wires, contacts, connecting circuit traces and inductors, also contribute to the metallic profile of the shimmer 402 and contribute to the alteration of the metallic profile of the environment of the chip card reader 401 which the fraud detection device is monitoring. A sensor coil 604 (FIG. 6) or a pair of sensor coils can be arranged, for example, directly over or under the area where contacts 408 are located, with parameters optimized in order to detect the shimmer metal contacts. In some embodiments, the use of a sensor coil 604 or a pair of sensor coils can be positioned at other locations. The use of several sensor coils 604 (FIG. 6) at different locations is preferable because this results in data points from different locations of the chip card reader. For example, where a sensor coil is used directly above or directly below contacts 408, the sensor coil may detect a significant amount of metal from contacts 408 and contact chip 405. A sensor coil placed at other locations (e.g. proximate to bezels 410) would provide a different metallic profile and could help detect the presence of shimmer 402. Other fraudulent devices and rogue magnetic read heads may be positioned at other locations within the chip card reader, so it is preferable to arrange sensor coils 604 (FIG. 6) at other areas (e.g. proximate to magnetic stripe reader) to ensure that the sensed area is able to detect any fraudulent devices in the chip card reader.

Figure 7:
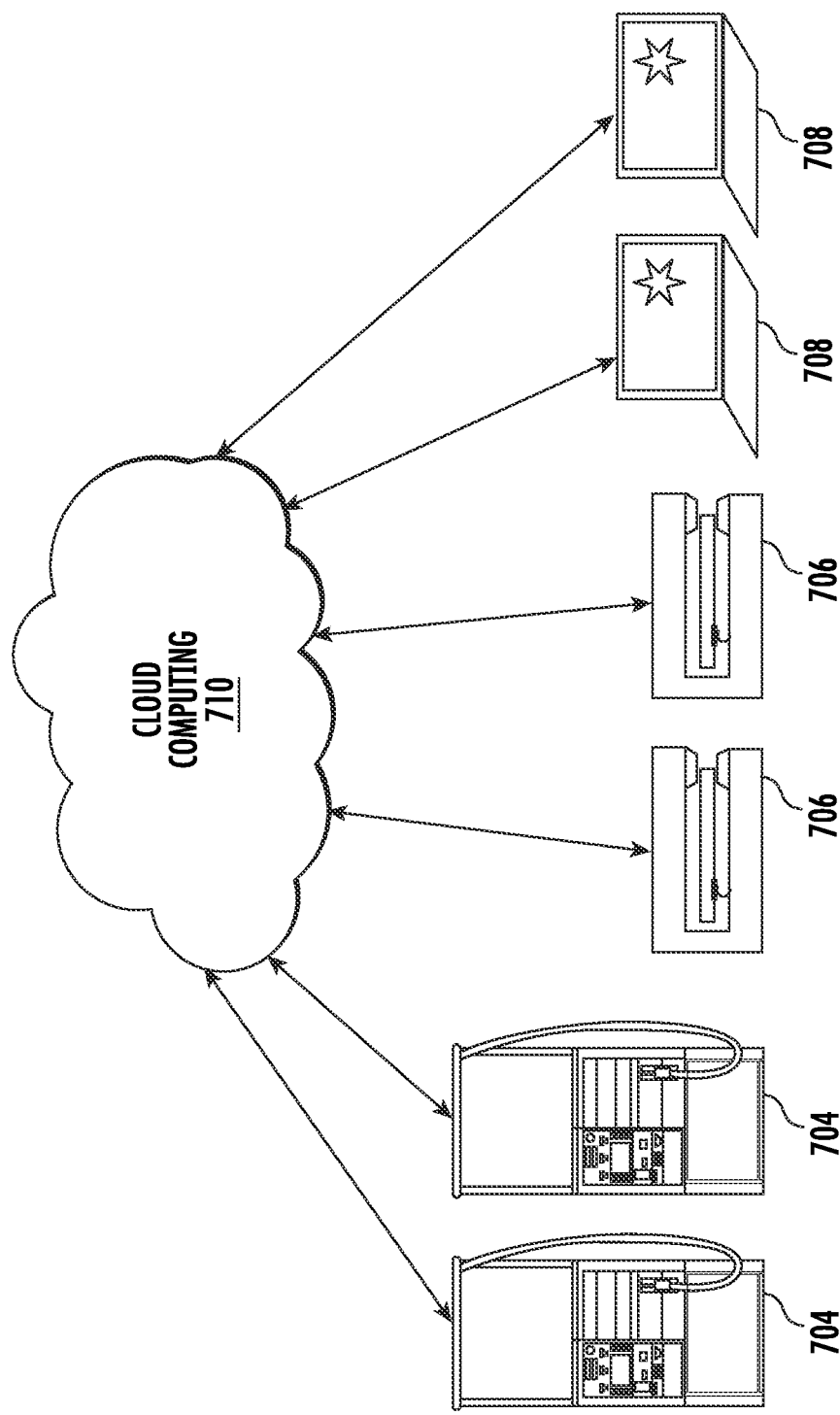
FIG. 7 is a diagrammatic representation showing cloud computing resources that may be used to relay fraud detection flags to third parties in accordance with an embodiment of the present invention.

FIG. 7 illustrates cloud computing resources that may be used to relay fraud detection flags to third parties in accordance with an embodiment of the present invention. As shown in FIG. 7, fraud detection devices may be disposed in fuel dispensers 704 or point of sale ("POS") terminals 706. These fraud detection devices may connect to other third-party resources 708 such as through the use of cloud computing resources 710. Cloud connection is an effective way to relay detection flags to the owners of card readers. Third-party resources 708 may be alert systems for oil companies, credit card companies, restaurant chains, department store owners, etc. In some embodiments, the communications network can allow for sharing of the processing load amongst multiple processors if desired. For example, a processor located on the fraud detection device, coupled to the LDC converters, may perform analysis of short-term metallic profile changes, while an external processor may perform longer term analysis of the data. Alternatively, sensor data may be communicated to third-party resources to permit external processing where third-party resources perform any analysis. Various other methods of sharing processing load can be utilized.

Figure 8:
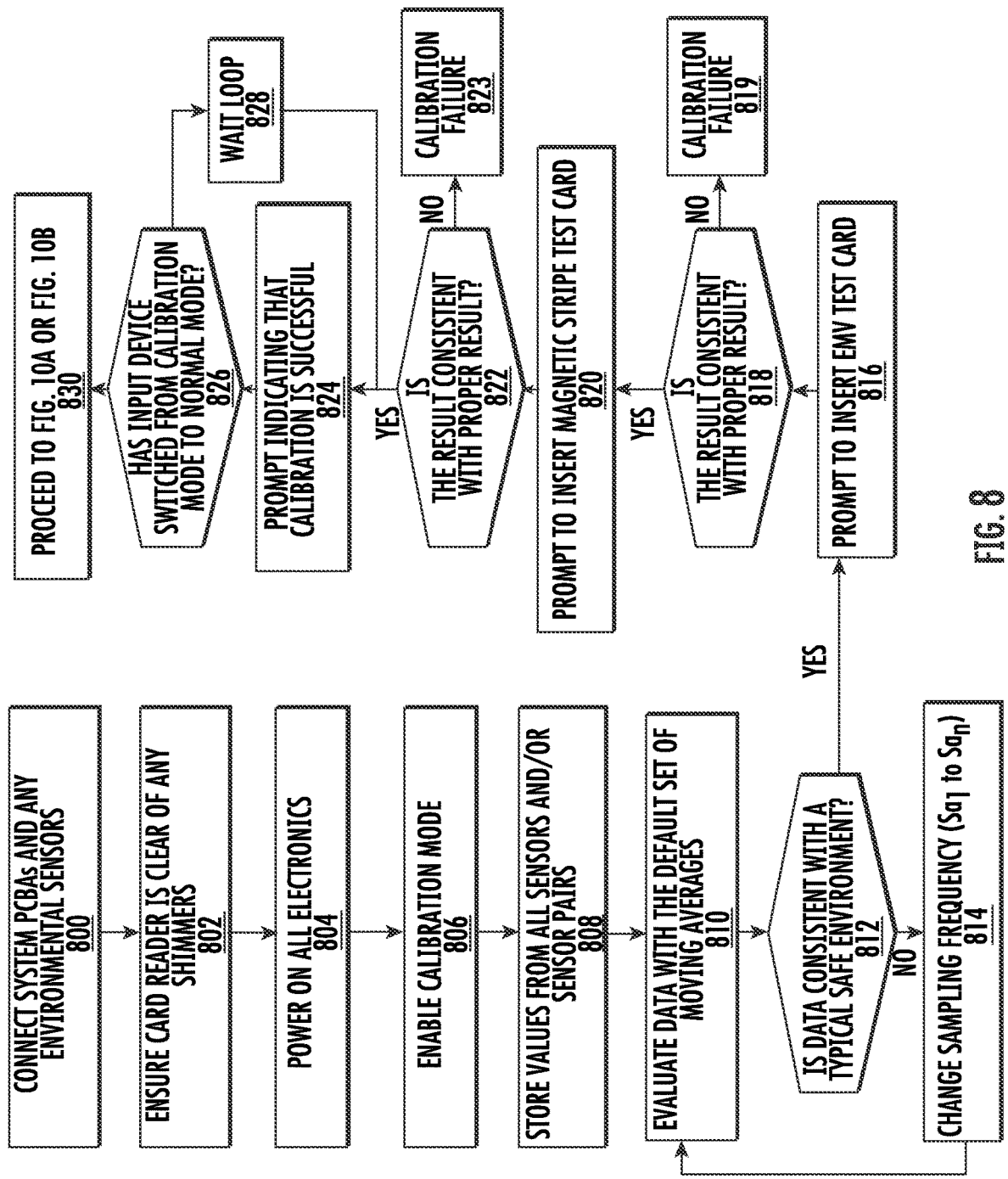
FIG. 8 is an exemplary flow chart illustrating steps of a method for calibrating a fraud detection apparatus and establishing a reference profile in accordance with an embodiment of the present invention.

FIG. 8 is an exemplary flow chart illustrating steps of a method for calibrating a fraud detection device and establishing a reference profile in accordance with an embodiment of the present invention. The methods of calibration are beneficial as they refine the system so that the accuracy and precision of the system is improved. Calibration may or may not be necessary, depending on target card reader design and various fraud detection device design parameters.

The flow chart begins at block 800, at which PCBAs 502 (FIG. 5) and any environmental sensors 506 (FIG. 5) are situated adjacent to the chip card reader 401 (FIG. 4A). The person performing calibration will preferably evaluate whether other components are properly connected as well at block 800. Then, at block 802, the person performing calibration should ensure that the chip card reader 401 (FIG. 4A) is clear of any shimmers and clear of any other fraudulent devices. To look for shimmers, one should look closely at positions near contacts 408 (FIGS. 4A, 4B). However, fraudulent devices may be positioned at other locations, and the person performing calibration will preferably investigate other positions within the chip card reader to ensure that no fraudulent devices are present. At block 802, the person performing calibration will preferably look for metallic objects or electrical devices near chip card reader, and to the extent possible, the person performing calibration will preferably move the chip card reader to a different location or move those objects or devices away from the chip card reader.

At block 804, all electronics are powered on, and at block 806, calibration mode is enabled. The person performing calibration may enable calibration mode by selecting the appropriate field(s) in user interface 516 (FIG. 5). Alternatively, in some embodiments, the calibration mode may automatically begin when the electronics are powered on at block 804.

Once calibration mode has been enabled at block 806, the process may move forward to block 808, where sensor values are obtained for each of the sensors by scanning each of the sensors. This scanning may be done using the multiplexer as described herein. More than one sensor value will preferably be obtained for each sensor and stored in memory in order to obtain more accurate calibration data.

At block 810, the data stored at block 808 is evaluated. In some embodiments, moving averages may be used. In evaluating the data, moving averages of the real-time LDC sensors' sample values may be used. Moving averages may take the average of multiple data points at a given sensor. For example, moving averages may be obtained using the average of the last five sensor readings from a given sensor. The use of a moving average can be used to filter data that is outside typical envelopes. Slower sampling rates in conjunction with moving averages can filter the variability in metallic profile that may occur as a result of electromagnetic interference in the vicinity of the reader that is fast changing relative to the amount of time it takes to insert, read, and remove a card. The use of moving averages can improve the reliability of fraud detection, making the fraud detection device less likely to indicate faults due to sudden changes in frequency. The moving average sample length can be adjusted as a function of reader type, differing environments, or other variables. An ideal moving average sample length can also be determined a priori and stored in the fraud detection device's memory. Where moving averages are used, the moving averages preferably cover a time period that is shorter than a typical card read event. While the fraud detection device may preferably use moving averages, fraud detection devices according to the present invention may also operate without using moving averages.

At block 812, a decision is made as to whether data is consistent with a typical safe environment. If the data is not consistent with a typical safe environment, then the process moves to block 814 and the sampling frequency is changed. For example, if the sensor data is showing abrupt changes that are shorter than the time it typically takes to install a shimmer, then the sampling frequency can be reduced. After the sampling frequency has been changed, the process may loop back to block 810 and proceed from there. If the data is consistent with a typical safe environment, then the process moves to block 816. In some embodiments, where sensor data is showing abrupt changes that are significantly shorter than the time it typically takes to install a shimmer and the sampling frequency has been reduced past a minimum threshold (San), the system may indicate a calibration error at block 814. In other embodiments, if the data shows a strong consistency with a typical safe environment, the sampling frequency may be increased. In some embodiments, where abrupt changes are occurring that are significantly shorter than the time it typically takes to install a shimmer, the number of data points used to calculate moving averages may be increased. By increasing the number of data points, the device may analyze more consistent trends and the device is less prone to fluctuate greatly based on sudden changes in the environment. The moving average will preferably remain shorter than the time it typically takes to install a shimmer.

At block 816, the fraud detection device may prompt the person performing calibration to insert an EMV test card. The microprocessor 514 (FIG. 5) or another component may cause the user interface 516 (FIG. 5) to generate this prompt. The fraud detection device may wait until an EMV test card has been inserted before the process proceeds to block 818. This may be accomplished by receiving input from a contact sensor deployed within the chip card reader that is contacted when a card or another foreign object is present within the chip card reader. In some embodiments, before the fraud detection device prompts the person performing calibration to insert an EMV test card, the fraud detection device may indicate on a user interface that the previous calibration step was successful.

At block 818, a determination is made as to whether the result generated by the insertion of the EMV test card is consistent with a proper result. This determination may be made based on difference in the anticipated electrical profile when an EMV test card is used and the actual electrical profile with an EMV test card is used. Substantial differences in electromagnetic interference, inductance, impedance, frequency, etc. may be evaluated at block 818.

If the result is deemed to be inconsistent with the proper result at block 818, then the process moves forward to block 819, which indicates that a calibration failure has occurred. At block 819, the fraud detection device may prompt the person performing calibration that a calibration failure has occurred. The microprocessor 514 (FIG. 5) or another component may cause the user interface 516 (FIG. 5) to generate this prompt. A calibration error may occur for several reasons including but not limited to (1) a high sampling frequency, which may be subject to sudden changes in the environment; (2) not using moving averages or using moving averages with only a small number of data points; (3) faulty connection of equipment; (4) faulty equipment; (5) disturbances within the environment; and (6) errors in performing the calibration process. Where a calibration failure occurs, the person performing calibration may evaluate the failure and take appropriate steps to remedy the issue. This may require the person performing calibration to start over at block 800, to start over at another point in the process shown in FIG. 8, to possibly obtain replacement parts, etc.

If the result at block 818 is deemed to be consistent with the proper result, then the process moves forward to block 820. At block 820, the fraud detection device may prompt the person performing calibration to insert a magnetic stripe test card. The microprocessor 514 (FIG. 5) or another component may cause the user interface 516 (FIG. 5) to generate this prompt. The fraud detection device may wait until a magnetic stripe test card has been inserted until the process proceeds to block 822. This may be accomplished by receiving input from a contact sensor deployed within the chip card reader that is contacted when a card is present within the chip card reader. In some embodiments, before the fraud detection device prompts the person performing calibration to insert a magnetic stripe test card, the fraud detection device may indicate on a user interface that the previous calibration step was successful. While a card with only a magnetic stripe typically has no metal, its insertion may modify the magnetic profile of the card reader. For example, insertion of a magnetic stripe card may deflect reader chip contacts and modify the magnetic profile. Thus, by conducting profile calibration for magnetic stripe test cards, the fraud detection apparatus learns to distinguish between magnetic stripe cards and EMV cards in its installed environment and can also sample typical human hand profiles to operate the reader.

If the result is deemed to be inconsistent with the proper result at block 822, then the process moves forward to block 823, which indicates that a calibration failure has occurred. At block 823, the fraud detection device may prompt the person performing calibration that a calibration failure has occurred. The microprocessor 514 (FIG. 5) or another component may cause the user interface 516 (FIG. 5) to generate this prompt. The person performing calibration may evaluate the failure and take appropriate steps to remedy the issue. This may require the person performing calibration to start over at block 800, to start over at another point in the process shown in FIG. 8, to possibly obtain replacement parts, etc.

If the result at block 822 is deemed to be consistent with the proper result, then the process moves forward to block 824. At block 824, the fraud detection device may prompt the person performing calibration that that calibration is successful. In some embodiments, the user interface may then provide the user with the option to begin a "normal mode." During normal mode, the fraud detection device may be used to scan data from sensors and compare the data as described herein.

After presenting the prompt indicating that calibration is successful at block 824, a determination is made at 826 as to whether the chip card reader has switched from calibration mode to normal mode. If the chip card reader has not switched to normal mode, then the process may be sent to a wait loop at block 828, and the fraud detection device will not proceed to block 830 until normal mode has begun. If the chip card reader has switched to normal mode, then process may move forward to the process described in FIG. 10A or FIG. 10B.

FIG. 8 is only intended to provide an exemplary flow chart. Additional steps may be implemented, steps included within FIG. 8 may be omitted, or the order of the steps may be altered in other embodiments. For example, steps could be added to calibrate for the proximity of human hands, and, in some embodiments, blocks 820, 822, and 823 may be omitted.

FIG. 9 is an exemplary matrix used to hold data in accordance with an embodiment of the present invention. This matrix may be used to store real time LDC sensor values for all sensors. In this embodiment, calibration values are permanently stored in the first row. However, in other embodiments, additional information may be retained permanently within the matrix where that information is useful to the operation of the fraud detection device. An average calibration value is shown in FIG. 9, but multiple values can be stored for each parameter. A separate column is shown for environmental sensor data. This environmental sensor data can be organized with the detection sensors data as shown, such that real time compensation calculations are efficient. Slower moving data, for example moving averages and other data the processor needs for a longer term, can be stored in separate memory structures maintained by the microprocessor. As shown, the matrix may include up to n rows. The matrix will preferably be large enough and the memory provided within the fraud detection device will preferably be great enough to store and capture trends utilized in real time calculations.

Figure 10A:
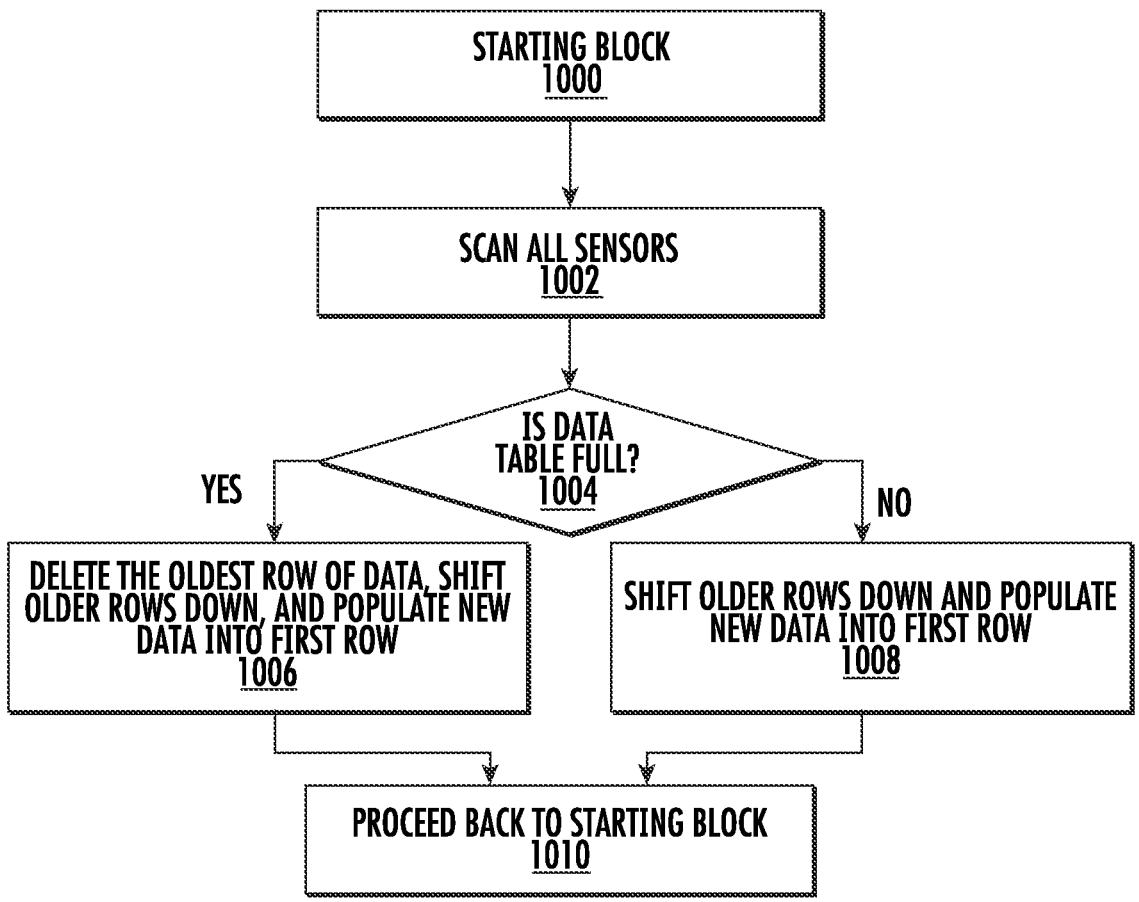
FIG. 10A is a flow chart illustrating steps of a method for populating a data matrix during normal operation in accordance with an embodiment of the present invention.
Figure 10B:
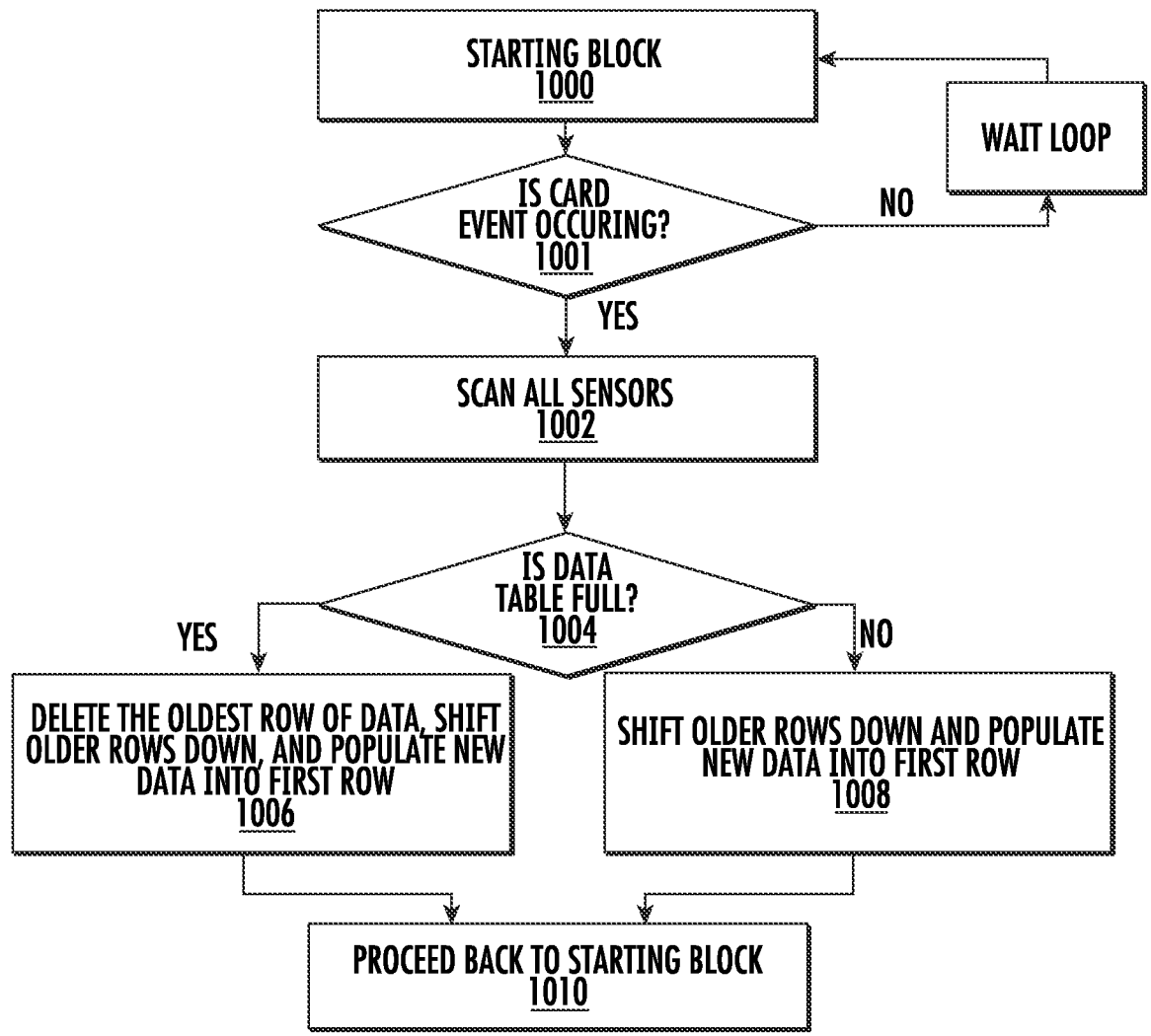
FIG. 10B is a flow chart illustrating steps of an alternative method of real time processing for shimmer detection in accordance with an embodiment of the present invention.

FIGS. 10A and 10B are exemplary flow charts illustrating steps of a method for populating a data matrix during normal operation. Starting with FIG. 10A, the presented flow chart begins at starting block 1000. At block 1002, the fraud detection device may scan through each of the sensors, obtaining a sensor reading from each of the sensors. As stated above, this may be done by sending electrical current through sensor coils within each individual sensor (or pairs or groups of sensor coils) at separate times. Additionally, this sensor data may be an input to a multiplexer, and the multiplexer may output the sensor data to the processing unit where the data may be stored in memory. This data may be stored into a matrix similar to the one shown in FIG. 9.

The real time values shown can be organized into a first-in-last-out finite memory array. In this regard, a determination is made at block 1004 as to whether the data matrix is full. If the matrix is full, then the process proceeds to block 1006, where the oldest row of data is deleted, the older rows are shifted down, and the new data is populated in the first available row for real time values. If the matrix is not full at block 1004, then the process proceeds to block 1008, where the older rows are shifted down and the new data is populated in the first available row for real time values. At block 1010, the process recycles back to starting block 1000.

Using the matrix illustrated in FIG. 9 as an example, as new data is obtained, that data may first occupy the cells within the row "Real-Time Value 1." As newer data is obtained, the newest data may occupy the cells within the row "Real-Time Value 1" and older rows may be shifted down to lower rows. Once the cells within each row have been populated, the newest data may occupy the cells within the row "Real-Time Value 1," the data within the other cells may be shifted down, and the oldest real time data may be deleted.

In an alternative embodiment, as new data is obtained, that data may occupy cells within the row "Real-Time Value n" and older rows may be shifted down to the lower rows with the same label (i.e. data labeled with "Real-Time Value 1" will maintain the same label). In this alternative embodiment, once the matrix fills up with data, new data can populate the top row, older data may shift down, and the oldest data (e.g. data at "Real-Time Value 1") may be deleted.

FIG. 10B shows an alternative embodiment where scanning only occurs when a card event is occurring. In this embodiment, an additional determination may be made at block 1001 as to whether a card event is occurring. If a card event is occurring, then the event may proceed to block 1002. However, when no card event is occurring, a wait loop may be formed, sending the process back to starting block 1000. In this embodiment, no scanning will occur until a card event is detected.

FIG. 11 is an exemplary flow chart illustrating steps of a method of real time processing for shimmer detection in accordance with an embodiment of the present invention. This method may be performed by microprocessor 514 (FIG. 5) or any other suitable device. Sensor data is obtained from memory 515 (FIG. 5) or from some other source. At block 1100, this matrix of data is evaluated. In evaluating the data, moving averages of the real-time LDC sensors' sample values may be used.

At block 1102, the sensor data for sensors 504 (FIG. 5) are compared with the sensor data from environmental sensors 506 (FIG. 5). At block 1104, a decision is made as to whether sensors 504 (FIG. 5) produce data that tracks data from the environmental sensors 506 (FIG. 5) when no card event is occurring. If the data from sensors 504 (FIG. 5) does not track data from the environmental sensor 506 (FIG. 5), then the microprocessor 514 (FIG. 5) will proceed to block 1106. At block 1106, the microprocessor 514 (FIG. 5) will investigate whether the difference was caused by a calibration fault or if a fraudulent device such as a shimmer is present. Appropriate flags may also be set at block 1106. For example, the fraud detection device may cause the chip card reader to display an appropriate prompt, the fraud detection device may cause the chip card reader to be deactivated until the issue is investigated and the chip card reader is reactivated by a technician, the fraud detection device may communicate the flagged activity to the card owner and the owner of the chip card reader, etc.

If the data from sensors 504 (FIG. 5) does track data from the environmental sensor 506 (FIG. 5) when no card event is occurring, then the microprocessor 514 (FIG. 5) will proceed to block 1108. At block 1108, another decision is made as to whether sensors that detect legitimate cards indicate that a card event is occurring. These sensors may be contact sensors as discussed above, but other sensors may also be used. If these sensors do not detect a card event, then the microprocessor 514 (FIG. 5) may proceed to block 1110. If the sensors detect a card event, then the microprocessor 514 (FIG. 5) may proceed to block 1112.

At block 1110, microprocessor 514 (FIG. 5) resets a read count for the card event to zero if the read count is not already zero. Microprocessor 514 (FIG. 5) then cycles back to block 1100 where the process begins again.

At block 1112, which is reached only where a card event is detected at block 1108, the read count is incremented. After the read count is incremented at block 1112, microprocessor 514 (FIG. 5) proceeds to block 1114. At block 1114, a decision is made as to whether the read count has been exceeded for the card event. If the read count has been exceeded, then microprocessor 514 (FIG. 5) proceeds to block 1116, where appropriate flags may be set. For example, the fraud detection device may cause the chip card reader to display an appropriate prompt, the fraud detection device may cause the chip card reader to be deactivated until the issue is investigated and the chip card reader is reactivated by a technician, the fraud detection device may communicate the flagged activity to the card owner and the owner of the chip card reader, etc. At block 1114, the microprocessor may also evaluate whether shimmers or other fraudulent devices are present using the approaches described herein, and the microprocessor may evaluate the data from specific sensors to determine areas where shimmers or other fraudulent devices may be positioned.

If the read count has not been exceeded at block 1114, then the microprocessor may cycle back to block 1100 and the process may proceed through the described process again. FIG. 11 is only intended to provide an exemplary flow chart. Additional steps may be implemented, steps included within FIG. 11 may be omitted, or the order of the steps may be altered in other embodiments.

Figure 12:
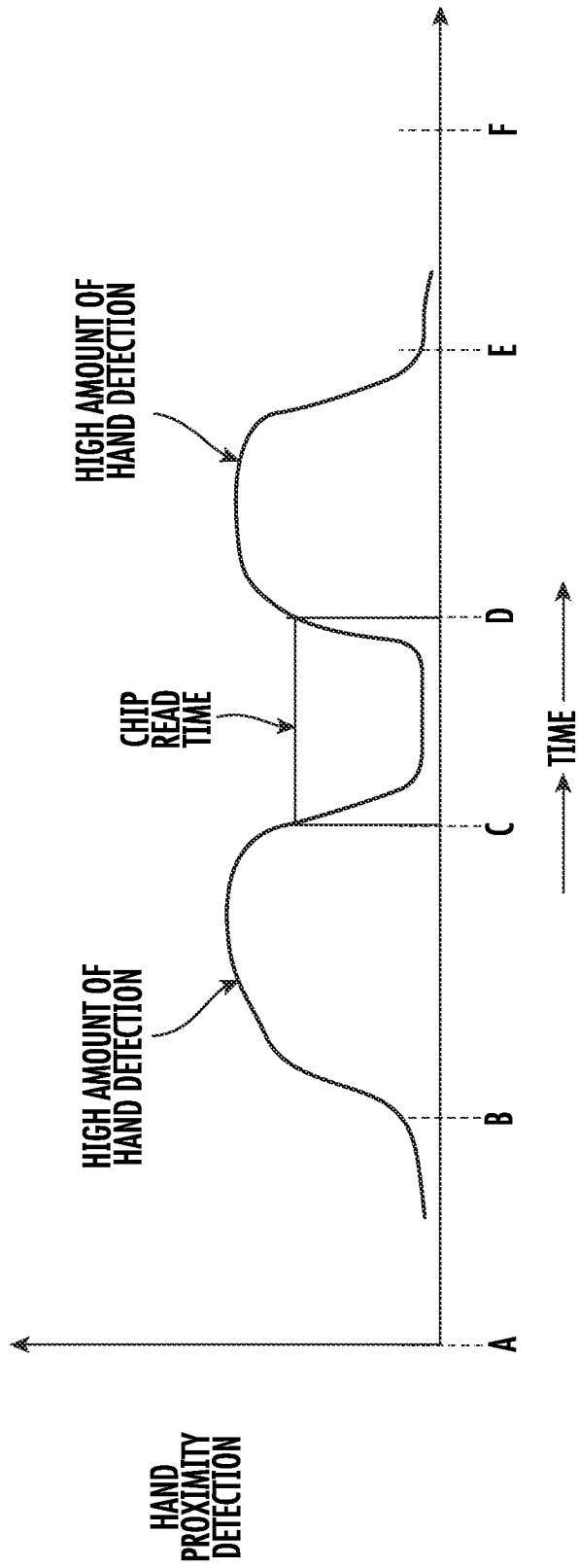
FIG. 12 is an exemplary profile showing the various stages of a typical consumer transaction with a chip card reader in accordance with an embodiment of the present invention.

FIG. 12 is an exemplary profile showing the various stages of a typical consumer transaction with a chip card reader in accordance with an embodiment of the present invention. The fraud detection device may be improved by developing models for human insertion and removal of the card and using the models to incorporate data about the transaction stage and the proximity of human hands. Various insertion/removal profiles, such as the profile shown in FIG. 12, could be established and compared as part of the shimmer detection method. FIG. 12 diagrams a typical transaction where a chip card is being inserted into a chip card reader, and points A, B, C, D, E, and F help to demonstrate various stages within the transaction. Between points A and B, the reader is idle, and the amount of anticipated hand proximity is low. Between points B and C, a transaction is beginning, and a customer's hands may be close to the fraud detection device at this stage. A customer's hand may be close to the chip card reader and the fraud detection device because the customer may be operating a user interface to input necessary information for the transaction, because the customer is inserting a chip card, etc. Due to the necessity of customer input during this stage, the anticipated amount of hand detection may be relatively high. Between points C and D, a chip card has been inserted into the chip card reader and the chip card reader may be in the process of reading the chip card. The anticipated amount of hand detection may vary in different profiles depending on the chip card reader, but the exemplary profile in FIG. 12 anticipates less hand detection during this stage. Between points D and E, a customer may be removing the card from the chip card reader and contacting the user interface to input further information (e.g. indicating whether they would like a receipt), and the anticipated amount of hand detection may be relatively high during this period. The customer's transaction is complete at point E, so the anticipated amount of hand detection may be very low between points E and F.

If a contactless credit card reader, or some other contactless reader, such as a loyalty FOB reader is mounted in the vicinity of the chip card reader, human hands used to present a contactless card, smart phone, loyalty FOB, etc. to the contactless reader may be sensed by the fraud detection device. In such legitimate use cases, the anti-fraud device senses a hand present in the proximity of the reader, while the alternate contactless reader senses the presented device. The communications interfaces from the fraud detection device can interface with other system elements to correlate the hand proximity sensing with legitimate events of chip or contactless transactions.

Hand proximity sensing may be part of the reference profile determination upon initial installation of the reader, as described herein. The fraud detection apparatus may learn the various hand proximity effect results from presenting targets to the various readers in the proximity of the fraud detection device. During calibration for hand proximity, the person performing calibration can take place his or her hands in common areas near a chip card reader where a user's hands would most likely be located, such as proximate to the location where a chip card is inserted, proximate to any magnetic stripe reader, proximate to the user interface, etc.

This proximity sensing feature enables more robust fraud detection algorithms to be implemented. For example, proximity sensing of hands by the fraud detection device with no associated chip or contactless transactions could be a marker for potential fraud. Correlation of hand proximity sensing with legitimate service technician time logs could further improve the marker for potential fraud, for example detecting an unauthorized criminal tampering with the reader or associated equipment when no authorized technician is present.

In the event a shimmer or some other fraudulent device is introduced into the reader, the fraud detection device can observe the difference between the reference profile and the current profile as one with more metal, as discussed above. Furthermore, the anti-fraud device can correlate the time of introduction of the shimmer with a different human hand proximity signature than a normal card insertion, for the case of the shimmer involving more time to introduce than a legitimate card, if this was the case. By using additional data about card activity and hand proximity, the system may attempt to obtain additional corroborating information to confirm the presence of a fraudulent device. For example, if the B to C and E to F times are excessive, this could be correlated with a small change in the metallic profile occurring in time near point C, indicating the possible insertion of a shimmer at that instant, as the time to insert a shimmer may be more than with a legitimate card read.

As discussed above, a microcontroller 514 (FIG. 5) may perform artificial intelligence to learn from the behavior of the system to improve the accuracy of fraud detection. In the context of FIG. 12, an example of learned behavior can include the profile of a person with a disability resulting in slow insertion and removal (longer B to C and D to E), versus a more typical time.

Figure 13A:
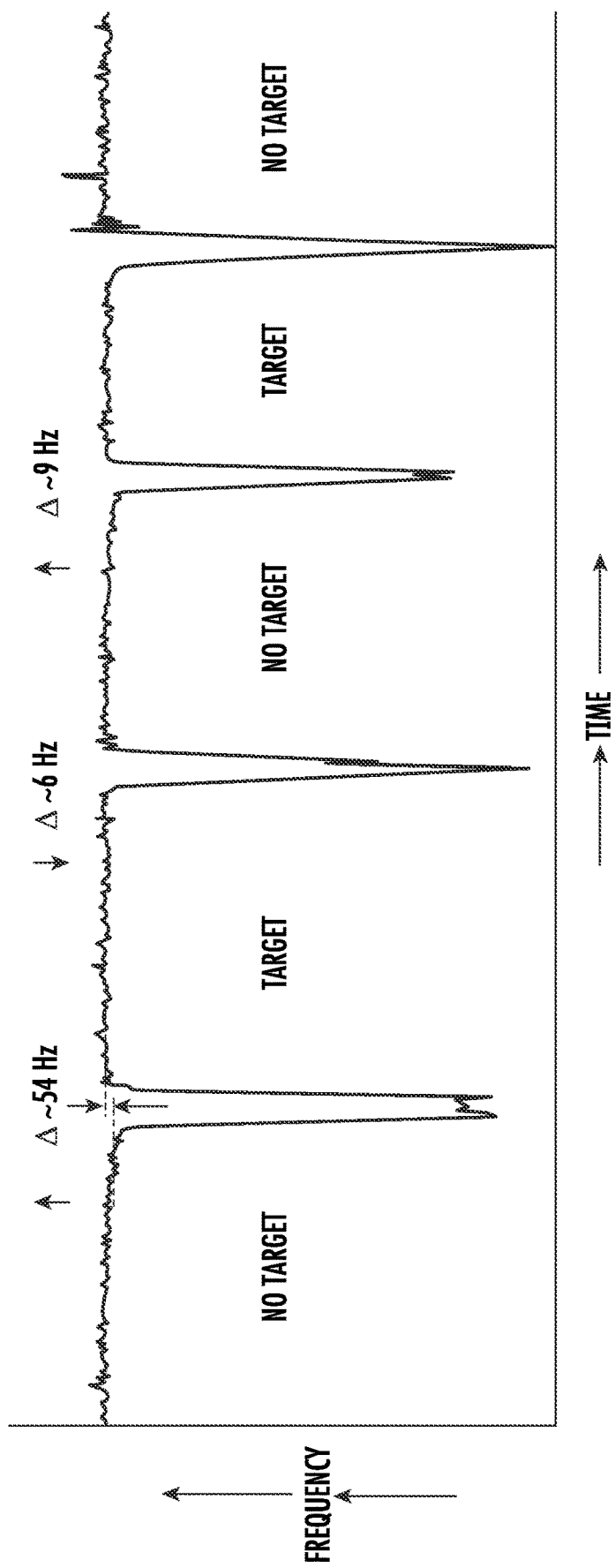
FIG. 13A is a graph showing variations in frequency when only a chip card is being inserted in accordance with an embodiment of the present invention.

FIGS. 13A and 13B show exemplary plots with time on the x-axis and frequency oscillograph results of the fraud detection device on the y-axis in accordance with an embodiment of the present invention. In FIG. 13A, a standard chip card was used without a shimmer or any other fraudulent device present, and in FIG. 13B, a shimmer simulator is being inserted into and removed from the chip card reader. The test environment is similar to the environment depicted in FIG. 2. The figures show when the respective target is present, with the target being a chip card in FIG. 13A and a simulated shimmer in FIG. 13B. The dips in frequency are caused by the hand inserting or removing the target. The figures both indicate the magnitude of the frequency difference when a target is present as compared to when no target is present. The magnitude of frequency difference for a chip card was far less than for a shimmer simulator. When a chip card is inserted and/or removed from the chip card reader, the frequency only changed up or down by an average of 23 Hz. When a simulated shimmer was inserted and/or removed from the chip card reader, the frequency changed by an average of 288.5 Hz. In practice, these frequency differentials may be highly dependent on the card reader and anti-fraud device implementation, but they are significant enough to distinguish between the two situations.

Figure 14:
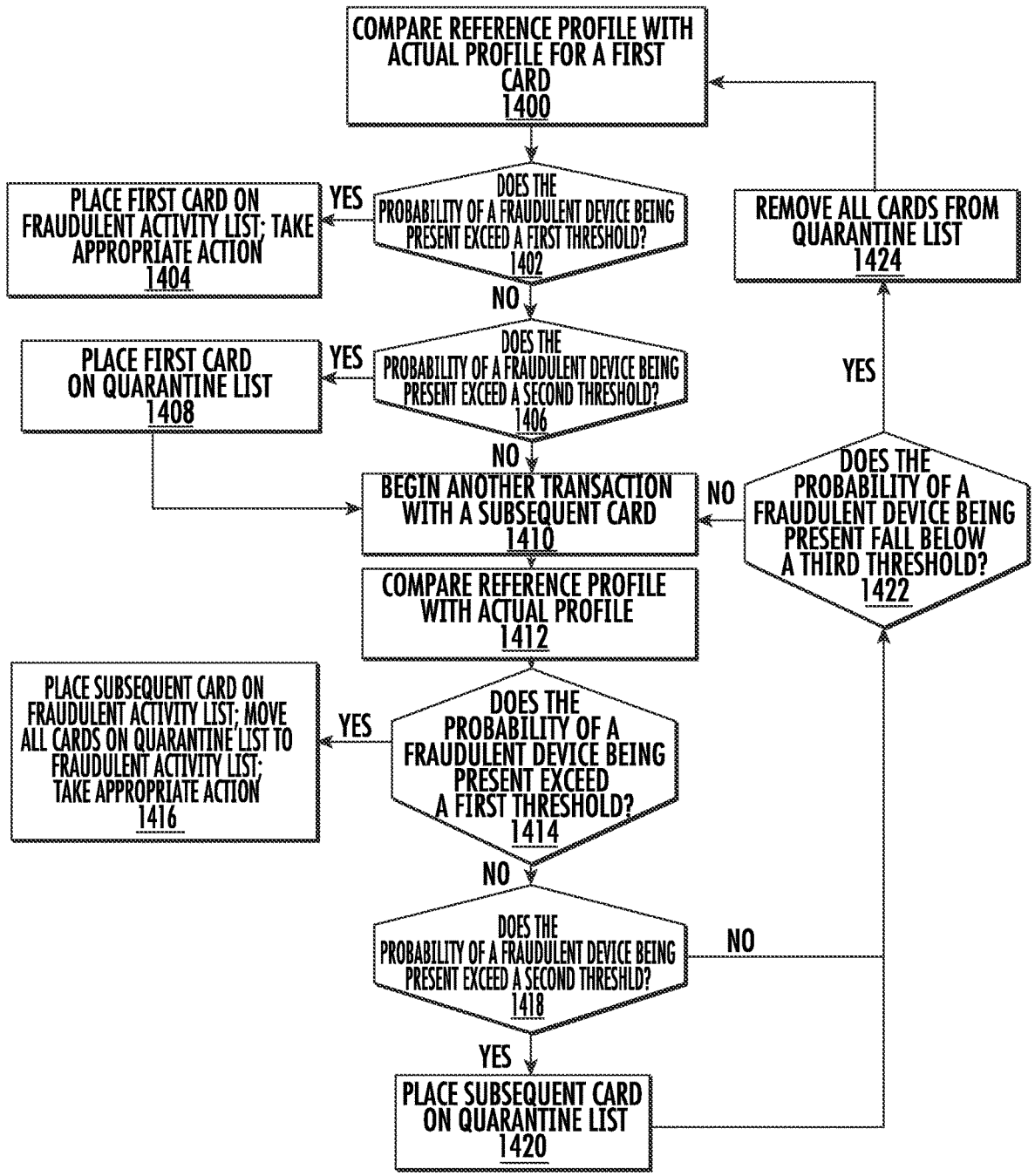
FIG. 14 is a flow chart illustrating steps of a method of evaluating sensor data to determine whether fraudulent activity is occurring in accordance with an embodiment of the present invention.

FIG. 14 shows an exemplary flow chart illustrating steps of a method of evaluating sensor data to determine whether fraudulent activity is occurring in accordance with an embodiment of the present invention. Once the fraud detection device determines that the introduction of a shimmer has possibly occurred, it can take several steps. If the fraud detection device determines the possibility that a shimmer or some other fraudulent device has been introduced, but with a less-than-ideal likelihood, the system can be designed to allow evaluation of some number of future card insertions. In this way it can obtain corroborating evidence as to the existence of the fraudulent device, as the card inserted profile would likely be different after the fraudulent device is inserted. The software can observe if the amount of metal for a normal transaction is increased, as now the metal quotient is the sum of the metal in the shimmer plus the metal in the card. Furthermore, as mentioned before, the reader chip card contacts are likely more depressed. This is because the shimmer and the card are both deflecting the contacts. This changed transaction signature can be considered as corroboration that a shimmer has been inserted.

As any card transactions allowed after the fraud detection device determines some probability exists that a fraudulent device has been introduced, these card transactions are possibly "sacrificed" in order to determine with more certainty if a shimmer has been introduced. To counter this, the fraud detection device can signal to the system via its communications interfaces that this particular transaction may have some risk of fraud associated with it. The card data can be quarantined by the overall system. If a subsequent investigation discovers a shimmer, quarantined card owners can be notified, the cards can be cancelled or replaced, or some other countermeasure can be implemented.

Once the fraud detection device determines a shimmer exists with sufficient probability, it can place the card associated with a transaction on a fraudulent activity list and/or take other appropriate actions. For example, the fraud detection device may send an alert to the legitimate owner of the reader, via various methods. These may include a local electrical interface to an audible or lighted alarm at the reader location, sending data to the overall system to allow the quarantine of future card data, sending an alert to local owner consoles such as the POS in a department store, or sending an alert to remote consoles (e.g. in a department store or major oil company head office). These alerts can be sent via the communications interfaces to the microprocessor in the fraud detection device. The alerts can result in various actions, such as disabling the chip card reader until an investigation determines if a shimmer or another fraudulent device has actually been introduced.

FIG. 14 provides an exemplary flow chart illustrating how a fraudulent activity list and a quarantine list may function in accordance with an embodiment of the present invention. At block 1400, a reference profile is compared with the actual profile for a first card. Then, at block 1402, a determination is made as to whether the probability of a fraudulent device being present exceeds a first threshold. This first threshold should be relatively high to prevent incorrect determinations that fraudulent activity is occurring.

If the probability exceeds the first threshold at block 1402, then the process moves to block 1404. At block 1404, the first card is placed on a fraudulent activity list, and appropriate action is taken to address this fraudulent activity.

If the probability does not exceed the first threshold at block 1402, then the process moves to block 1406. At block 1406, another decision is made as to whether the probability of a fraudulent device being present exceeds a second threshold. This second threshold may be lower than the first threshold, but the second threshold may still be relatively high to prevent incorrect determinations that suspicious activity may be occurring. If the probability exceeds the second threshold, then the process moves to block 1408. At block 1408, the first card is placed on a quarantine list. After the first card is placed on the quarantine list at block 1408, the process moves to block 1410. Further, if the probability does not exceed the first threshold, then the process moves directly to block 1410.

At block 1410, another transaction begins with a subsequent card. At block 1412, the actual profile generated when the subsequent card was used with the chip card reader is compared with a reference profile. Then, at block 1414, a determination is made as to whether the probability of a fraudulent device exceeds the first threshold. In some embodiments, the probability of a fraudulent device at block 1414 will take into account the data for previous cards that are on a quarantine list, or the probability may take into account data for all previous cards. In this way, where the difference between a reference profile and actual profile for cards is consistently larger than normal, the probability of a fraudulent device at 1414 may be high enough to exceed the first threshold, even where this probability would not be high enough to exceed the first threshold for any individual card. In other embodiments, where the difference between a reference profile and actual profile for cards has been consistently larger than normal, the first threshold itself may be lowered.

If the probability exceeds the first threshold at block 1414, then the process moves to block 1416. At block 1416, the subsequent card is placed on a fraudulent activity list. Additionally, all cards that have been placed on the quarantine list may also be moved to a fraudulent activity list. Appropriate action may be taken to address this fraudulent activity.

If the probability does not exceed the first threshold at block 1414, then the process moves to block 1418. At block 1418, a determination is made as to whether the probability of a fraudulent device being present exceeds a second threshold. As stated previously, this second threshold may be lower than the first threshold, but the second threshold may still be relatively high to prevent incorrect determinations that suspicious activity may be occurring. In some embodiments, the probability of a fraudulent device at block 1418 will take into account the data for previous cards that are on a quarantine list, or the probability may take into account data for all previous cards. In this way, where the difference between a reference profile and actual profile for cards is consistently larger than normal, the probability of a fraudulent device at 1418 may be high enough to exceed the second threshold, even where this probability would not be high enough to exceed the second threshold for any individual card. In other embodiments, where the difference between a reference profile and actual profile for cards has been consistently larger than normal, the second threshold itself may be lowered at block 1418. If the probability exceeds the second threshold, then the process moves to block 1420. If the probability does not exceed the second threshold, then the process moves directly to block 1422.

If the probability exceeds the second threshold, then the process moves to block 1420. At block 1420, the subsequent card is placed on the quarantine list. After this, the process moves forward to block 1422.

At block 1422, a determination is made as to whether the probability of a fraudulent device being present falls below a third threshold. If the probability of a fraudulent device falls below this low value, then the system will have sufficient confidence that no fraudulent device is present. Thus, the third threshold should preferably be a low value to prevent false determinations. As discussed above, the probability of a fraudulent device may take into account the data for previous cards that are on a quarantine list, or the probability may take into account data for all previous cards. In other embodiments, where the difference between a reference profile and actual profile for cards has been consistently larger or smaller than normal, the third threshold itself may be adjusted at block 1422. If the probability is not lower than the third threshold at block 1422, then the process moves to block 1410 and proceeds through the subsequent steps.

If the probability is lower than the third threshold at block 1422, then the process moves to block 1424. At block 1424, all cards that are on the quarantine list (if any) may be removed. After block 1424, the process returns to block 1400 where a new first card may be inserted.

FIG. 14 is only intended to provide an exemplary flow chart. Additional steps may be implemented, steps included within FIG. 14 may be omitted, or the order of the steps may be altered in other embodiments. For example, rather than using probabilities at blocks 1402, 1406, 1414, 1418, and 1422, specific values such as frequency may be compared. Additionally, while a quarantine list is used in FIG. 14, other embodiments may not use a quarantine list.

If chip card reader is appropriately connected to the fraud detection device, the chip card reader may also detect and report suspicious activity and place certain card data on the fraudulent activity list or quarantine list for detected potential error cases. For example, where a card exhibits an excessive error rate on data transfer, the chip card reader itself may send a signal to the fraud detection device and/or another device where the quarantine list is maintained. That card could be flagged for replacement or potentially investigated for fraudulent activity, such as potentially being an illicit copy of a stolen card.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A shimmer detection apparatus for detecting a shimmer, comprising:
   a chip card reader defining a slot for receipt of a chip card;
   processing circuitry including a memory;
   a first sensor in communication with said processing circuitry, said first sensor comprising at least one sensor coil;
   said at least one sensor coil of the first sensor disposed proximate to contacts of the chip card reader, said at least one sensor coil of the first sensor operative to generate a first magnetic field when electrical current flows through said at least one sensor coil, wherein the first sensor is operative to measure at least one electrical value from the first magnetic field;
   said processing circuitry operative to receive information representative of at least one electrical value of said first sensor; and
   said memory having stored therein information representative of at least one predetermined electrical value, further comprising:
   a second sensor in communication with said processing circuitry, said second sensor comprising at least one sensor coil, wherein said second sensor is disposed away from the chip card reader, wherein said at least one sensor coil of the second sensor is operative to generate a second magnetic field when electrical current flows through said at least one sensor coil of the second sensor, said second sensor operative to measure at least one electrical value from the second magnetic field;
   said processing circuitry operative to receive information representative of at least one electrical value of the second sensor; and
   said processing circuitry further operative to compare the information representative of at least one electrical value of the first sensor with the information representative of at least one electrical value of the second sensor, said processing circuitry further operative to indicate potentially fraudulent activity based on the comparison.

2. The shimmer detection apparatus of claim 1, further comprising a card detector, wherein the processing circuitry is further operative to indicate potentially fraudulent activity if the input signal indicates that an object is being detected by the card detector for greater than a first time period.

3. The shimmer detection apparatus of claim 2, wherein the card detector comprises a contact, wherein the contact rests in a first position when an object is touching the contact and wherein the contact rests in a second position when an object is touching the contact.

4. The shimmer detection apparatus of claim 1, further comprising
   incrementing a read count if a card is detected in the chip card reader; and
   indicating potentially fraudulent activity if the read count is greater than a specified period.

5. The shimmer detection apparatus of claim 1, further comprising:
   a multiplexer, said multiplexer in electrical communication with the first sensor and the second sensor, said multiplexer operative to receive information from the first sensor representative of at least one electrical value for the first sensor, said multiplexer operative to receive information from the second sensor representative of at least one electrical value for the second sensor, wherein the multiplexer is operative to output data for only a selected sensor, wherein the selected sensor is one of the first sensor and the second sensor.

6. The shimmer detection apparatus of claim 5, wherein the multiplexer is operative to repeatedly alternate between the first sensor and the second sensor.

7. The shimmer detection apparatus of claim 6, wherein a time interval by which the multiplexer alternates between the first sensor and the second sensor is no greater than one millisecond.

8. Apparatus for detecting tampering with a chip card reader comprising:
   processing circuitry;
   a first sensor in communication with said processing circuitry, said first sensor comprising at least one sensor coil;
   said at least one sensor coil of the first sensor operative to generate a first magnetic field when electrical current flows through said at least one sensor coil of the first sensor, and said first sensor operative to measure at least one electrical value from the first magnetic field;
   a second sensor in communication with said processing circuitry, said second sensor comprising at least one sensor coil;
   said at least one sensor coil of the second sensor operative to generate a second magnetic field when electrical current flows through said at least one sensor coil of the second sensor, and said second sensor operative to measure at least one electrical value from the second magnetic field;

said processing circuitry operative to receive a first signal representative of the at least one electrical value of said first sensor, and said processing circuitry operative to receive a second signal representative of the at least one electrical value of said second sensor; and a multiplexer, said multiplexer operative to activate only one selected sensor from the first sensor and the second sensor at a given time, wherein said selected sensor is the first sensor at a first time and wherein said selected sensor is the second sensor at a second time.

9. Apparatus for detecting tampering with a chip card reader comprising:

processing circuitry;

a sensor in electronic communication with said processing circuitry, said sensor comprising at least one sensor coil, wherein the at least one sensor coil is disposed proximate to a chip card reader, said at least one sensor coil is operative to generate a magnetic field when electric current flows through the at least one sensor coil, said sensor is operative to measure at least one electrical value from the magnetic field;

said processing circuitry operative to receive a signal representative of at least one electrical value of said sensor; and said sensor operative to detect the presence of a human hand proximate to the chip card reader, wherein said sensor is operative to detect the presence of a human hand proximate to the chip card reader by sensing changes in the frequency generated in the magnetic field of the at least one sensor coil.

10. Apparatus for detecting tampering with a chip card reader comprising:

processing circuitry;

a sensor in electronic communication with said processing circuitry, said sensor comprising at least one sensor coil, wherein the at least one sensor coil is disposed proximate to a chip card reader, said at least one sensor coil is operative to generate a magnetic field when electric current flows through the at least one sensor coil, said sensor is operative to measure at least one electrical value from the magnetic field;

said processing circuitry operative to receive a signal representative of at least one electrical value of said sensor; and said sensor operative to detect the presence of a human hand proximate to the chip card reader, wherein:

said processing circuitry is operative to retrieve the typical transaction duration from a memory, said processing circuitry being further operative to indicate a fault if a human hand is detected proximate to the chip card reader for a duration longer than the typical transaction duration.

11. Apparatus for detecting tampering with a chip card reader comprising:

processing circuitry;

a sensor in electronic communication with said processing circuitry, said sensor comprising at least one sensor coil, wherein the at least one sensor coil is disposed proximate to a chip card reader, said at least one sensor coil is operative to generate a magnetic field when electric current flows through the at least one sensor coil, said sensor is operative to measure at least one electrical value from the magnetic field;

said processing circuitry operative to receive a signal representative of at least one electrical value of said sensor; and said sensor operative to detect the presence of a human hand proximate to the chip card reader, wherein the processing circuitry is operative to receive a contact signal, said contact signal being operative to indicate the presence of an object within a chip card reader, the device further comprising a memory having stored therein a predetermined value of a typical transaction duration, said processing circuitry being further operative to indicate a fault based on data provided regarding the presence of a human hand, based on data provided by the contact sensor, and based on differences between the at least one electrical value of sensor and a second electrical value that is predetermined.

12. The apparatus of claim 11, said processing circuitry being further operative to indicate potentially fraudulent activity if the difference between the at least one electrical value of the sensor and the second electrical value is greater than a threshold value, wherein said threshold value is adjusted if a human hand has been detected for an extended period of time, wherein said threshold value is adjusted if the contact sensor detects the presence of an object within the chip card reader.

13. Apparatus for detecting tampering comprising:

a chip card reader;

processing circuitry;

a first sensor in electronic communication with said processing circuitry, said first sensor being operative to measure at least one electrical value indicative of a metal profile of the chip card reader;

a second sensor in electronic communication with said processing circuitry, said second sensor being operative to measure at least one electrical value indicative of a metal profile of the chip card reader;

said processing circuitry operative to receive a first signal representative of the at least one electrical value of said first sensor, and said processing circuitry operative to receive a second signal representative of the at least one electrical value of said second sensor; and a multiplexer operative to activate only one selected sensor from the first sensor and the second sensor at a given time, wherein said selected sensor is the first sensor at a first time and wherein said selected sensor is the second sensor at a second time.

14. The apparatus of claim 13, further comprising a first printed circuit board assembly layer, wherein the first sensor and the second sensor are both integrated into the first printed circuit board assembly layer.

15. The apparatus of claim 13, further comprising a first printed circuit board assembly layer and a second printed circuit board assembly layer, wherein the first sensor is integrated into the first printed circuit board assembly layer and the second sensor is integrated into the second printed circuit board assembly layer.

16. The apparatus of claim 15, wherein the first printed circuit board assembly layer is stacked on top of the second printed circuit board assembly layer and the first printed circuit board assembly layer and second printed circuit board assembly layer are part of a single printed circuit board assembly.

17. The apparatus of claim 15, wherein the first printed circuit board assembly layer is part of a first printed circuit board assembly and the second printed circuit board assembly layer is part of a second printed circuit board assembly.

18. Apparatus for detecting tampering with a chip card reader comprising:
- processing circuitry;
- a first printed circuit board assembly, said first printed circuit board assembly comprising a first sensor in electronic communication with said processing circuitry, said first sensor comprising at least one sensor coil, said at least one sensor coil of the first sensor operative to generate a first magnetic field when electrical current flows through said at least one sensor coil of the first sensor, said first sensor operative to measure at least one electrical value from the first magnetic field;
- said processing circuitry operative to receive a signal representative of at least one electrical value of the first sensor; and
- said first printed circuit board assembly is attached to a first external surface of the chip card reader.

19. The apparatus of claim 18, further comprising
- a second printed circuit board assembly, said second printed circuit board assembly comprising a second sensor in electronic communication with said processing circuitry, said second sensor comprising at least one sensor coil, said at least one sensor coil of the second sensor operative to generate a second magnetic field when electrical current flows through said at least one sensor coil of the second sensor, said second sensor operative to measure at least one electrical value from the second magnetic field;
- said second printed circuit board assembly is attached to a second external surface of the chip card reader.

* * * * *

UNITED STATES PATENT AND TRADEMARK OFFICE
CERTIFICATE OF CORRECTION

| | |
|---|---|
| PATENT NO. | : 12,056,559 B2 |
| APPLICATION NO. | : 17/477132 |
| DATED | : August 6, 2024 |
| INVENTOR(S) | : Giovanni Carapelli et al. |

It is certified that error appears in the above-identified patent and that said Letters Patent is hereby corrected as shown below:

On the Title Page

On page 2, Column 2, Line 14, under "Other Publications", delete "Terget" and insert -- Target --.

In the Specification

In Column 14, Line 62, delete "Texas" and insert -- Texas. --.

In Column 20, Line 33, delete "that that" and insert -- that --.

Signed and Sealed this
First Day of October, 2024

Katherine Kelly Vidal
*Director of the United States Patent and Trademark Office*